United States Patent
Li

(10) Patent No.: US 9,824,353 B2
(45) Date of Patent: Nov. 21, 2017

(54) KEY PROTECTION METHOD AND SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 14/760,213

(22) PCT Filed: Sep. 24, 2013

(86) PCT No.: PCT/CN2013/084117
§ 371 (c)(1),
(2) Date: Jul. 10, 2015

(87) PCT Pub. No.: WO2014/107977
PCT Pub. Date: Jul. 17, 2014

(65) Prior Publication Data
US 2015/0363775 A1 Dec. 17, 2015

(30) Foreign Application Priority Data
Jan. 10, 2013 (CN) .......................... 2013 1 0009435

(51) Int. Cl.
*G06Q 20/38* (2012.01)
*H04W 12/04* (2009.01)
(Continued)

(52) U.S. Cl.
CPC ......... *G06Q 20/3829* (2013.01); *G06Q 40/02* (2013.01); *H04L 9/0825* (2013.01);
(Continued)

(58) Field of Classification Search
None
See application file for complete search history.

(56) References Cited

U.S. PATENT DOCUMENTS

2007/0241180 A1 10/2007 Park et al.
2012/0089519 A1* 4/2012 Peddada ............ G06Q 20/3829
705/71

FOREIGN PATENT DOCUMENTS

CN 102118251 7/2011
CN 103067401 4/2013

OTHER PUBLICATIONS

WIPO, International Search Report for PCT/CN2013/084117, dated Dec. 26, 2013.
(Continued)

*Primary Examiner* — Calvin L Hewitt, II
*Assistant Examiner* — Nakia Leffall-Allen
(74) *Attorney, Agent, or Firm* — Hodgson Russ LLP

(57) ABSTRACT

Proposed are a key protection method and system. The method comprises: a: receiving by a mobile terminal a registration instruction, generating a user's public key and private key, and sending the user's public key to a third-party e-business verification server, if the mobile terminal respectively passes identity verifications of the mobile bank server and a comprehensive pre-position bank server; b: performing a verification by the mobile bank server on user's trade information, and performing a trade by the comprehensive pre-position bank server if the verification is successful; c: generating by the mobile terminal an updated parameter for protecting a private key after the trade is performed, sending to the mobile bank server, receiving a successful updating result from the mobile bank server and encrypting and storing the user's private key. The present invention can increase the difficulty of an attack, and improve security.

20 Claims, 7 Drawing Sheets

(51) Int. Cl.
*H04L 9/08* (2006.01)
*H04L 9/32* (2006.01)
*G06Q 40/02* (2012.01)
*H04L 29/06* (2006.01)

(52) U.S. Cl.
CPC ............ *H04L 9/321* (2013.01); *H04L 9/3263* (2013.01); *H04W 12/04* (2013.01); *H04L 63/0823* (2013.01); *H04L 2209/56* (2013.01); *H04L 2209/80* (2013.01)

(56) References Cited

OTHER PUBLICATIONS

WIPO, Written Opinion of the International Searching Authority for PCT/CN2013/084117, dated Dec. 26, 2013.

* cited by examiner

KEY PROTECTION METHOD AND SYSTEM

CROSS-REFERENCE TO RELATED APPLICATIONS

This application is a U.S. national phase application of International Application No. PCT/CN2013/084117, filed on Sep. 24, 2013, which is based on upon and claims priority to Chinese Patent Application 201310009435.8, filed on Jan. 10, 2013, the entire contents of which are incorporated herein by reference.

FIELD

Embodiments of the present invention generally relate to an information safety technology, and more particularly, to a key protection method and a key protection system.

BACKGROUND

In recent years, with rapid developments of Internet and financial informatizaiton, an online banking has been universally respected by users and bank industries due to its convenience and high efficiency, in which a digital certificate is an identification of each of the user and a bank server in a trade therebetween via the online banking and is capable of securing safety of an online trade.

Currently, a user's public key certificate is generated by the bank server and is sent to a terminal used by the user after the user's public key certificate is verified by a third-party e-business verification server. There exists a problem that when the bank server sends the user's public key certificate to the terminal, the bank server may not know which terminal to send the user's public key certificate to, so the user's public key certificate may be intercepted, and thus the user's public key certificate may be stolen during a sending thereof and also safety of the user's public key certificate cannot be secured in the trade, thereby resulting in a potential safety hazard.

SUMMARY

A first aspect of the present disclosure is to provide a key protection method, including: a: receiving by a mobile terminal a registration instruction, and generating by a mobile terminal a user's public key and a user's private key according to the registration instruction, and sending by a mobile bank server the user's public key to a third-party e-business verificaiton server to be verified and signed so as to generate and store a user's public key certificate, if the mobile terminal respectively passes identity verifications of the mobile bank server and a comprehensive pre-position bank server; b: performing a verification by the mobile bank server on encrypted user's trade information sent from the mobile terminal using the user's public key certificate, and performing a trade by the comprehensive pre-position bank server if the verification is successful; c: generating by the mobile terminal an updated parameter for protecting a private key after the trade is performed, sending by the mobile terminal the updated parameter for protecting the private key to the mobile bank server, receiving by the mobile terminal a successful updating result from the mobile bank server, and storing by the mobile terminal the user's private key encrypted using the updated parameter for protecting the private key.

With the key protection method according to embodiments of the present disclosure, the user's public key and the user's private key are generated in the mobile terminal, the mobile bank server and the comprehensive pre-position bank server perform identify verifications on the mobile terminal, and the mobile bank server sends the user's public key to the third-party e-business verification server to be verified and signed so as to generate and store the user's public key certificate, if the mobile terminal respectively passes the identity verifications of the mobile bank server and the comprehensive pre-position bank server. Meanwhile, the mobile bank server performs the verification on the encrypted user's trade information sent from the mobile terminal using the user's public key certificate in the trade and updates the private key protection parameter of the user's private key after the trade. Thus, since the mobile bank server has performed the identify verification on the mobile terminal during the generation of the user's public key certificate, the mobile bank server knows exactly which mobile terminal to communicate with, which prevents a simulated mobile terminal from interacting with the mobile bank server, secures the safety thereof and increases the difficulty of attack. Moreover, the mobile bank server performs the verification on the encrypted user's trade information sent from the mobile terminal using the user's public key certificate in the trade, so the safety of the trade is secured, and the private key protection parameter is updated after the trade so as to encrypt and store the user's private key, thereby further securing the safety of the trade.

In some embodiments, step a includes: a1: obtaining by the mobile terminal public keys of the mobile bank server and the comprehensive pre-position bank server, and respectively performing verifications by the mobile terminal on the public keys of the mobile bank server and the comprehensive pre-position bank server, and establishing by the mobile terminal a connection with the mobile bank server according to the registration instruction if the verifications are successful and generating by the mobile terminal the user's public key and the user's private key; a2: encrypting by the mobile terminal account information, first verification information and a first random encryption parameter to obtain encrypted information using the public key of the mobile bank server and sending by the mobile terminal the encrypted information to the mobile bank server; a3: decrypting by the mobile bank server the encrypted information from the mobile terminal using a private key of the mobile bank server to obtain the account information, the first verification information and the first random encryption parameter, and performing a verification by the mobile bank server on the first verification information and sending by the mobile bank server the account information to the comprehensive pre-position bank server if the verification is successful; a4: performing a verification by the comprehensive pre-position bank server on the account information from the mobile bank server and sending by the comprehensive pre-position bank server a verification result to the mobile bank server; a5: generating by the mobile bank server a second random encryption parameter and a second verification information and sending by the mobile bank server the second random encryption parameter and the second verification information to the mobile terminal, if the verification result is correct; a6: encrypting by the mobile terminal the second verification information and the user's public key using the first random encryption parameter and the second random encryption parameter so as to generate third verification information, and sending by the mobile terminal the third verification information to the mobile bank server; and a7: performing a verification by the mobile bank server on the third verification information from the mobile terminal, and sending by the mobile bank server the user's public key to the third-party e-business verification server to be verified and signed so as to generate the user's public key certificate if the verification is successful.

In some embodiments, step a2 further includes: encrypting by the mobile terminal hardware information of the mobile terminal using the public key of the mobile bank server, in which the hardware information is hardware characteristic information or a hash value of the hardware characteristic information and the hardware characteristic information includes a device serial number and/or a MAC address of network card.

In some embodiments, the account information includes a phone number, a credit card number and a login password, and step a2 includes: receiving by the mobile terminal the first verification information generated by the mobile bank server, in which the first verification information is a graphic verification code; and encrypting by the mobile terminal the phone number, the credit card number, a calculated hash value of the login password, the hardware information, the first random encryption parameter and the first verification information to obtain encrypted information using the public key of the mobile bank server, and sending by the mobile terminal the encrypted information to the mobile bank server, in which the first random encryption parameter is generated by the mobile terminal.

In some embodiments, sending by the mobile bank server the second random encryption parameter and the second verification information to the mobile terminal in step a5 includes: encrypting by the mobile bank server the second random encryption parameter using the first random encryption parameter, and sending by the mobile bank server an encrypted second random encryption parameter to the mobile terminal, and sending by the mobile bank server the second verification information to the mobile terminal in a text message.

In some embodiments, after sending by the mobile bank server the second random encryption parameter and the second verification information to the mobile terminal and before step a6, the method further includes: decrypting by the mobile terminal the encrypted second random encryption parameter using the first random encryption parameter to obtain the second random encryption parameter; and receiving by the mobile terminal the second verification information input by a user.

In some embodiments, step a6 includes: encrypting by the mobile terminal the second verification information and the user's public key to generate the third verification information using the first random encryption parameter and the second random encryption parameter, and signing by the mobile terminal the hardware information to generate first signature information using the user's private key and sending by the mobile terminal the third verification information, the user's public key and the first signature information to the mobile bank server.

In some embodiments, performing a verification by the mobile bank server on the third verification information from the mobile terminal in step a7 includes: encrypting by the mobile bank server the second verification information and the user's public key to generate fourth verification information using the first random encryption parameter and the second random encryption parameter stored therein, and performing a signature verification by the mobile bank server on the first signature information using the user's public key, and determining by the mobile bank server whether the third verification information is consistent with the fourth verification information and whether the signature verification on the first signature information is successful, in which if the third verification information is consistent with the fourth verification information and the signature verification on the first signature information is successful, the verification is successful.

In some embodiments, generating third verification information in step a6 includes: performing by the mobile terminal a sectionalized encryption on the second verification information and the user's public key using the first random encryption parameter and the second random encryption parameter.

In some embodiments, step b includes: b1: receiving by the mobile terminal the user's trade information to generate a first random number, in which the user's trade information includes at least a trade account and a trade amount; b2: encrypting by the mobile terminal the user's trade information to generate a trade message using the first random number, hardware information of the mobile terminal, the user's private key, public keys of the mobile bank server and the comprehensive pre-position bank server, and sending by the mobile terminal the trade message to the mobile bank server, in which the hardware information is hardware characteristic information or a hash value of the hardware characteristic information; b3: decrypting by the mobile bank server the trade message to obtain a decrypted trade message using a private key of the mobile bank server and the hardware information of the mobile terminal stored therein, and performing a verification by the mobile bank server on the decrypted trade message using the user's public key certificate; b4: generating by the mobile bank server an encryption key if the verification is successful, generating by the mobile bank server a digital envelope according to the encryption key, the private key of the mobile bank server, the public key of the comprehensive pre-position bank server and the trade information, and sending by the mobile bank server the digital envelope to the comprehensive pre-position bank server; and b5: decrypting by the comprehensive pre-position bank server the digital envelope to obtain decrypted trade information using the private key of the comprehensive pre-position bank server and the public key of the mobile bank server, and performing a signature verification by the comprehensive pre-position bank server on the decrypted trade information using the public key of the mobile bank server and completing by the comprehensive pre-position bank server the trade if the signature verification is successful.

In some embodiments, step b2 includes: encrypting by the mobile terminal a trade password or a hash value of the trade password to obtain a cryptograph of the trade password using the public key of the comprehensive pre-position bank server, and signing by the mobile terminal the trade information and the cryptograph of the trade password to generate a first digital signature using the user's private key; generating by the mobile terminal an encryption parameter key according to the first random number and the hardware information of the mobile terminal, and encrypting by the mobile terminal the trade information and the cryptograph of the trade password to generate a first message cryptograph using the encryption parameter key; encrypting by the mobile terminal the first random number to generate a first key cryptograph using the public key of the mobile bank server; and sending by the mobile terminal the first digital signature, the first message cryptograph and the first key cryptograph to the mobile bank server as the trade message.

In some embodiments, step b3 includes: decrypting by the mobile bank server the first key cryptograph to obtain the first random number using the private key of the mobile bank server; generating by the mobile bank server the encryption parameter key according to the first random number and the hardware information of the mobile terminal stored therein, decrypting by the mobile bank server the first message cryptograph to obtain the trade information and the cryptograph of the trade password using the encryption parameter key; and performing a signature verification by the mobile bank server on the first digital signature using the user's public key certificate stored therein.

In some embodiments, step b4 includes: generating by the mobile bank server the encryption key; encrypting by the mobile bank server the user's trade information and the cryptograph of the trade password to generate a second message cryptograph using the encryption key; encrypting by the mobile bank server the encryption key to generate a second key cryptograph using the public key of the comprehensive pre-position bank server; signing by the mobile bank server the trade information and the cryptograph of the trade password to generate a second digital signature using the private key of the mobile bank server; and sending by the mobile bank server the second digital signature, the second message cryptograph and the second key cryptograph to the comprehensive pre-position bank server as the digital envelope.

In some embodiments, step b5 includes: decrypting by the comprehensive pre-position bank server the second key cryptograph to obtain the encryption key using the private key of the comprehensive pre-position bank server; decrypting by the comprehensive pre-position bank server the second message cryptograph to obtain the trade information and the cryptograph of the trade password using the encryption key; performing a signature verification by the comprehensive pre-position bank server on the second digital signature using the public key of the mobile bank server; and completing by the comprehensive pre-position bank server the trade according to the trade information if the signature verification is successful.

In some embodiments, the encryption key is a symmetric encryption key.

In some embodiments, step c includes: c1: encrypting and storing by the mobile terminal a user's private key document generated by the user's private key in a predetermined region; c2: performing a user identity verification by the mobile terminal during the trade, and generating by the mobile terminal a second random number if the user identity verification is successful, and obtaining by the mobile terminal a first private key protection parameter and a second private key protection parameter from the mobile bank server according to the second random number; c3: decrypting by the mobile terminal the user's private key document stored therein to obtain a first decrypted user's private key document using the second private key protection parameter, and performing a first verification by the mobile terminal on the first decrypted user's private key document; c4: performing the trade using the user's private key document and updating an update identification of a private key protection parameter if the first verification is successful; c5: decrypting the user's private key document stored therein to obtain a second decrypted user's private key document using the first private key protection parameter and performing a second verification on the second decrypted user's private key document if the first verification is not successful; c6: performing the trade using the user's private key document and updating the update identification of the private key protection parameter if the second verification is successful; c7: generating by the mobile terminal the updated parameter for protecting the private key according to the trade result received thereby, and sending by the mobile terminal the updated parameter for protecting the private key and the update identification of the private key protection parameter to the mobile bank server; and c8: encrypting and storing by the mobile terminal the user's private key document again according to a successful updating result from the mobile bank server and using the updated parameter for protecting the private key.

In some embodiments, step c1 includes: encrypting and storing the user's private key document using a protection key of a user's private key, in which the user's private key document includes the user's private key and hardware information of the mobile terminal, and the protection key of the user's private key is generated by all or partial information of the hardware information or a hash value of hardware characteristic information, all or partial information of a login password or a hash value of the login password and the private key protection parameter.

In some embodiments, updating an update identification of a private key protection parameter in step c4 or c6 includes: updating the update identification of the private key protection parameter according to the first private key protection parameter or the second private key protection parameter configured to decrypt the user's private key document.

In some embodiments, between step c7 and step c8, the method further includes: updating by the mobile bank server the second private key protection parameter using the updated parameter for protecting the private key and updating the first private key protection parameter using the second private key protection parameter, if the update identification of the private key protection parameter is an identification corresponding to the second private key protection parameter; updating by the mobile bank server the second private key protection parameter using the updated parameter for protecting the private key, if the update identification of the private key protection parameter is an identification corresponding to the first private key protection parameter; returning by the mobile bank server a successful updating result to the mobile terminal.

In some embodiments, sending by the mobile terminal the updated parameter for protecting the private key and the update identification of the private key protection parameter to the mobile bank server in step c7 includes: encrypting by the mobile terminal the updated parameter for protecting the private key and the update identification of the private key protection parameter using the public key of the mobile bank server, and sending by the mobile terminal an encrypted updated parameter for protecting the private key and an encrypted update identification of the private key protection parameter to the mobile bank server; in which between step c7 and step c8, the method further includes: decrypting by the mobile bank server information from the mobile terminal to obtain the updated parameter for protecting the private key and the update identification of the private key protection parameter using the private key of the mobile bank server.

In some embodiments, verification by the mobile terminal on the decrypted user's private key document in step c3 includes: performing the verification by the mobile terminal on the decrypted user's private key document using the hardware information.

In some embodiments, obtaining by the mobile terminal a first private key protection parameter and a second private key protection parameter from the mobile bank server according to the second random number in step c2 includes: encrypting by the mobile terminal the second random number to obtain an encrypted second random number using the public key of the mobile bank server, and sending by the mobile terminal the encrypted second random number to the mobile bank server; decrypting by the mobile bank server encrypted information from the mobile terminal to obtain the second random number using the private key of the mobile bank server; encrypting by the mobile bank server the first private key protection parameter and the second private key protection parameter to obtain an encrypted first private key protection parameter and an encrypted second private key protection parameter using the second random number, and sending by the mobile bank server the encrypted first private key protection parameter and the encrypted second private key protection parameter to the mobile terminal; and decrypting by the mobile terminal information from the mobile bank server to obtain the first private key protection parameter and the second private key protection parameter using the second random number.

In some embodiments, performing a user's identity verification in step c2 includes: performing a verification according to a message verification code, performing a verification according to a dynamic password, performing a verification according to an electronic signature token or performing a verification according to a trade password.

A second aspect of the present disclosure is to provide a key protection system, including: a mobile terminal, a mobile bank server and a comprehensive pre-position bank server, in which the mobile terminal is configured to receive a registration instruction and to generate a user's public key and a user's private key according to the registration instruction; the mobile bank server is configured to send the user's public key to a third-party e-business verification server to be verified and signed so as to generate and store a user's public key certificate during a registration of the mobile terminal; the mobile bank server is further configured to perform a verification on encrypted user's trade information sent from the mobile terminal using the user's public key certificate, and the comprehensive pre-position bank server is configured to perform a trade if the verification is successful; the mobile terminal is further configured to generate an updated parameter for protecting a private key after the trade is performed, to send the updated parameter for protecting the private key to the mobile bank server, to receive a successful updating result from the mobile bank server and to store the user's private key encrypted using the updated parameter for protecting the private key.

With the key protection system according to embodiments of the present disclosure, the user's public key and the user's private key are generated in the mobile terminal, the mobile bank server and the comprehensive pre-position bank server perform identify verifications on the mobile terminal, and the mobile bank server sends the user's public key to the third-party e-business verification server to be verified and signed so as to generate and store the user's public key certificate, if the mobile terminal respectively passes the identity verifications of the mobile bank server and the comprehensive pre-position bank server. Meanwhile, the mobile bank server performs the verification on the encrypted user's trade information sent from the mobile terminal using the user's public key certificate in the trade and updates the private key protection parameter of the user's private key after the trade. Thus, since the mobile bank server has performed the identify verification on the mobile terminal during the generation of the user's public key certificate, the mobile bank server knows exactly which mobile terminal to communicate with, which prevents a simulated mobile terminal from interacting with the mobile bank server, secures the safety thereof and increases the difficulty of attack. Moreover, the mobile bank server performs the verification on the encrypted user's trade information sent from the mobile terminal using the user's public key certificate in the trade, so the safety of the trade is secured, and the private key protection parameter is updated after the trade so as to encrypt and store the user's private key, thereby further securing the safety of the trade.

In some embodiments, the mobile terminal is further configured to obtain public keys of the mobile bank server and the comprehensive pre-position bank server, to respectively perform verifications on the public keys of the mobile bank server and the comprehensive pre-position bank server, to establish a connection with the mobile bank server according to the registration instruction if the verifications are successful, to generate the user's public key and the user's private key, to encrypt account information, first verification information and a first random encryption parameter to obtain encrypted information using the public key of the mobile bank server and to send the encrypted information to the mobile bank server; the mobile bank server is further configured to decrypt the encrypted information from the mobile terminal using a private key of the mobile bank server to obtain the account information, the first verification information and the first random encryption parameter, to perform a verification on the first verification information and to send the account information to the comprehensive pre-position bank server if the verification is successful; the comprehensive pre-position bank server is further configured to perform a verification on the account information from the mobile bank server and to send a verification result to the mobile bank server; in which if the verification result is correct, the mobile bank server is further configured to generate a second random encryption parameter and second verification information, and to send the second random encryption parameter and the second verification information to the mobile terminal; the mobile terminal is further configured to encrypt the second verification information and the user's public key using the first random encryption parameter and the second random encryption parameter so as to generate third verification information, and to send the third verification information to the mobile bank server; the mobile bank server is further configured to perform a verification on the third verification information from the mobile terminal, and to send the user's public key to the third-party e-business verification server to be verified and signed so as to generate the user's public key certificate if the verification is successful.

In some embodiments, the mobile terminal is further configured to encrypt hardware information of the mobile terminal using the public key of the mobile bank server, in which the hardware information is hardware characteristic information or a hash value of the hardware characteristic information and the hardware characteristic information includes a device serial number and/or a MAC address of network card.

In some embodiments, the account information includes a phone number, a credit card number and a login password, and the mobile terminal is further configured to: receive the first verification information generated by the mobile bank server, in which the first verification information is a graphic verification code; and encrypt the phone number, the credit card number, the hash value of the login password calculated thereby, the hardware information, the first random encryption parameter and the first verification information to obtain an encrypted information using the public key of the mobile bank server, and to send the encrypted information to the mobile bank server, in which the first random encryption parameter is generated by the mobile terminal.

In some embodiments, the mobile bank server is further configured to encrypt the second random encryption parameter using the first random encryption parameter, to send an encrypted second random encryption parameter to the mobile terminal, and to send the second verification information to the mobile terminal in a text message.

In some embodiments, after the second random encryption parameter and the second verification information are sent to the mobile terminal, the mobile terminal is further configured to decrypt the encrypted second random encryption parameter using the first random encryption parameter to obtain the second random encryption parameter, and to receive the second verification information input by a user.

In some embodiments, the mobile terminal is further configured to encrypt the second verification information and the user's public key to generate the third verification information using the first random encryption parameter and the second random encryption parameter, to sign the hardware information to generate first signature information using the user's private key and to send the third verification information, the user's public key and the first signature information to the mobile bank server.

In some embodiments, the mobile bank server is further configured to encrypt the second verification information and the user's public key to generate fourth verification information using the first random encryption parameter and the second random encryption parameter stored therein, and to perform a signature verification on the first signature information using the user's public key, and to determine whether the third verification information is consistent with the fourth verification information and whether the signature verification on the first signature information is successful, in which if the third verification information is consistent with the fourth verification information and the signature verification on the first signature information is successful, the verification is passed.

In some embodiments, the mobile terminal is further configured to perform a sectionalized encryption on the second verification information and the user's public key using the first random encryption parameter and the second random encryption parameter.

In some embodiments, the mobile terminal is further configured to receive the user's trade information to generate a first random number, in which the user's trade information of user includes at least a trade account and a trade amount, to encrypt the user's trade information to generate a trade message using the first random number, hardware information of the mobile terminal, the user's private key, public keys of the mobile bank server and the comprehensive pre-position bank server, and to send the trade message to the mobile bank server, in which the hardware information is hardware characteristic information or a hash value of the hardware characteristic information; the mobile bank server is further configured to decrypt the trade message using a private key of the mobile bank server and the hardware information of the mobile terminal stored therein to obtain a decrypted trade message, to perform a verification on the decrypted trade message using the user's public key certificate, to generate an encryption key if the verification is successful, to generate a digital envelope according to the encryption key, the private key of the mobile bank server, the public key of the comprehensive pre-position bank server and the trade information, and to send the digital envelope to the comprehensive pre-position bank server; the comprehensive pre-position bank server is further configured to decrypt the digital envelope to obtain decrypted trade information using the private key of the comprehensive pre-position bank server and the public key of the mobile bank server, to perform a signature verification on the decrypted trade information using the public key of the mobile bank server and to complete the trade if the signature verification is successful.

In some embodiments, the mobile terminal is further configured to encrypt a trade password or a hash value of the trade password to obtain a cryptograph of the trade password using the public key of the comprehensive pre-position bank server, to sign the trade information and the cryptograph of the trade password to generate a first digital signature using the user's private key, to generate an encryption parameter key according to the first random number and the hardware information of the mobile terminal, to encrypt the trade information and the cryptograph of the trade password to generate a first message cryptograph using the encryption parameter key, to encrypt the first random number to generate a first key cryptograph using the public key of the mobile bank server, and to send the first digital signature, the first message cryptograph and the first key cryptograph to the mobile bank server as the trade message.

In some embodiments, the mobile bank server is further configured to decrypt the first key cryptograph to obtain the first random number using the private key of the mobile bank server, to generate the encryption parameter key according to the first random number and the hardware information of the mobile terminal stored therein, to decrypt the first message cryptograph to obtain the trade information and the cryptograph of the trade password using the encryption parameter key, and to perform a signature verification on the first digital signature using the user's public key certificate stored therein.

In some embodiments, the mobile bank server is further configured to generate the encryption key, to encrypt the user's trade information and the cryptograph of the trade password to generate a second message cryptograph using the encryption key, to encrypt the encryption key to generate a second key cryptograph using the public key of the comprehensive pre-position bank server, to sign the trade information and the cryptograph of the trade password to generate a second digital signature using the private key of the mobile bank server, and to send the second digital signature, the second message cryptograph and the second key cryptograph to the comprehensive pre-position bank server as the digital envelope.

In some embodiments, the comprehensive pre-position bank server is further configured to decrypt the second key cryptograph to obtain the encryption key using the private key of the comprehensive pre-position bank server, to decrypt the second message cryptograph to obtain the trade information and the cryptograph of the trade password using the encryption key, to perform a signature verification on the second digital signature using the public key of the mobile bank server, and to complete the trade according to the trade information if the signature verification is successful.

In some embodiments, the encryption key is a symmetric encryption key.

In some embodiments, the mobile terminal is further configured to: encrypt and store a user's private key document generated by the user's private key in a predetermined region; perform a user identify verification during the trade, generate a second random number if the user identity verification is successful, and obtain a first private key protection parameter and a second private key protection parameter from the mobile bank server according to the second random number; decrypt the user's private key document stored therein to obtain a first decrypted user's private key document using the second private key protection parameter, perform a first verification on the first decrypted user's private key document; perform the trade using the user's private key document and update an update identification of a private key protection parameter if the first verification is successful; decrypt the user's private key document stored therein to obtain a second decrypted user's private key document using the first private key protection parameter and perform a second verification on the second decrypted user's private key document if the first verification is not successful; perform the trade using the user's private key document and update the update identification of the private key protection parameter if the second verification is successful; generate the updated parameter for protecting the private key according to the trade result received thereby, and send the updated parameter for protecting the private key and the update identification of the private key protection parameter to the mobile bank server; and encrypt and store the user's private key again according to a successful updating result from the mobile bank server and using the updated parameter for protecting the private key.

In some embodiments, the mobile terminal is further configured to encrypt and store the user's private key document using a protection key of a user's private key, in which the user's private key document includes the user's private key and hardware information of the mobile terminal, and the protection key of the user's private key is generated by all or partial information of the hardware information or a hash value of hardware characteristic information, all or partial information of a login password or a hash value of the login password and the private key protection parameter.

In some embodiments, the update identification of the private key protection parameter is updated according to the first private key protection parameter or the second private key protection parameter configured to decrypt the user's private key document.

In some embodiments, the mobile bank server is configured to update the second private key protection parameter using the updated parameter for protecting the private key and to update the first private key protection parameter using the second private key protection parameter, if the update identification of the private key protection parameter is an identification corresponding to the second private key protection parameter; the mobile bank server is configured to update the second private key protection parameter using the updated parameter for protecting the private key, if the update identification of the private key protection parameter is an identification corresponding to the first private key protection parameter; the mobile bank server is configured to return a successful updating result to the mobile terminal.

In some embodiments, the mobile terminal is configured to encrypt the updated parameter for protecting the private key and the update identification of the private key protection parameter using the public key of the mobile bank server, and to send an encrypted updated parameter for protecting the private key and an encrypted update identification of the private key protection parameter to the mobile bank server; the mobile bank server is further configured to decrypt information from the mobile terminal to obtain the updated parameter for protecting the private key and the update identification of the private key protection parameter using the private key of the mobile bank server.

In some embodiments, the mobile terminal is further configured to verify the decrypted user's private key document using the hardware information.

In some embodiments, the mobile terminal is further configured to encrypt the second random number to obtain an encrypted second random number using the public key of the mobile bank server, and to send the encrypted second random number to the mobile bank server; the mobile bank server is further configured to decrypt encrypted information from the mobile terminal to obtain the second random number using the private key of the mobile bank server, to encrypt the first private key protection parameter and the second private key protection parameter to obtain an encrypted first private key protection parameter and an encrypted second private key protection parameter using the second random number, and to send the encrypted first private key protection parameter and the encrypted second private key protection parameter to the mobile terminal; and the mobile terminal is further configured to decrypt information from the mobile bank server to obtain the first private key protection parameter and the second private key protection parameter using the second random number.

In some embodiments, the user identify verification between the mobile bank server and the mobile terminal is implemented by means of a verification of a message verification code, a verification of a dynamic password, a verification of an electronic signature token or a verification of a trade password.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
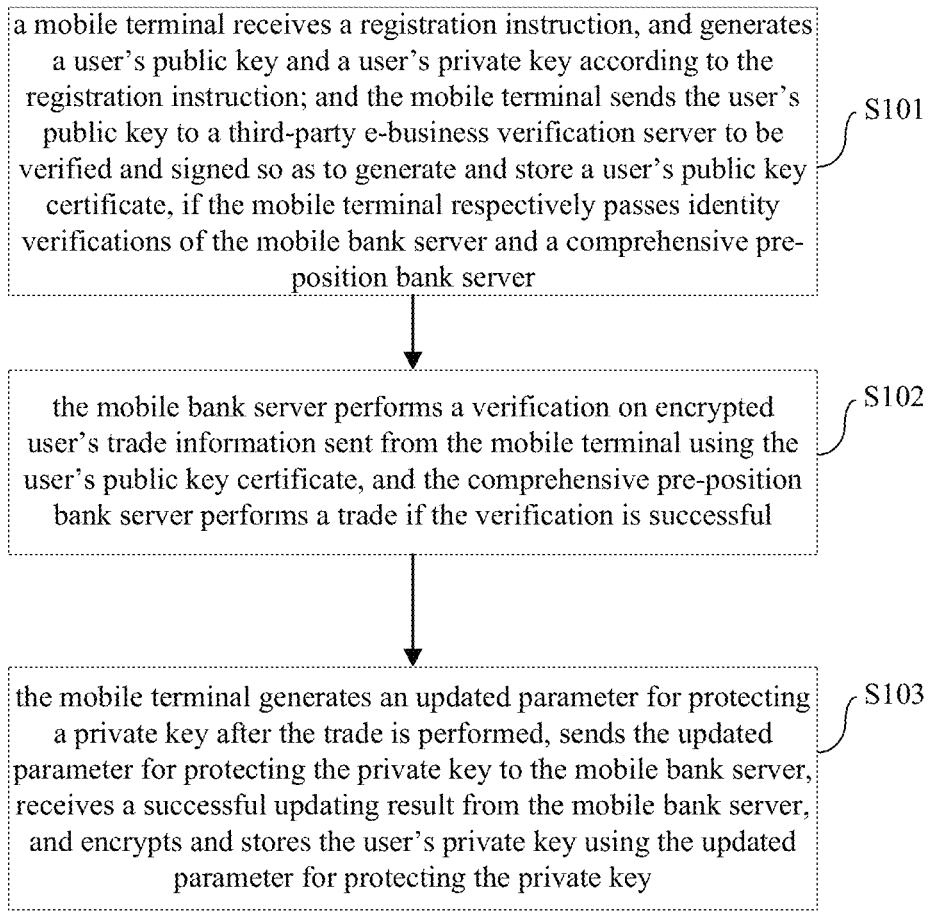
FIG. 1 is a flow chart of a key protection method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

In addition, it should be understood that terms such as "first" and "second" are used herein for purposes of description and are not intended to indicate or imply relative importance or significance. In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations. In addition, in the description of the present disclosure, "a plurality of" relates to two or more than two.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

A key protection method and a key protection system will be described in the following with reference to drawings.

FIG. 1 is a flow chart of a key protection method according to an embodiment of the present disclosure.

As shown in FIG. 1, the key protection method according to embodiments of the present disclosure includes following steps.

In step S101, a mobile terminal receives a registration instruction, and generates a user's public key and a user's private key according to the registration instruction; and the mobile terminal sends the user's public key to a third-party e-business verification server to be verified and signed so as to generate and store a user's public key certificate, if the mobile terminal respectively passes identity verifications of the mobile bank server and a comprehensive pre-position bank server.

Specifically, the mobile terminal downloads a bank client software and is registered via the bank client software. After receiving the registration instruction of the user, the mobile terminal generates the user's public key and the user's private key, and the mobile bank server and the comprehensive pre-position bank server perform the identify verifications on the mobile terminal during a registration of the mobile terminal. If the mobile terminal respectively passes the identity verifications of the mobile bank server and the comprehensive pre-position bank server, the mobile bank server sends the user's public key to the third-party e-business verification server to be verified and signed so as to generate and store the user's public key certificate, in which the user's public key certificate is stored in the mobile bank server and the comprehensive pre-position bank server respectively.

In step S102, the mobile bank server performs a verification on encrypted user's trade information sent from the mobile terminal using the user's public key certificate, and the comprehensive pre-position bank server performs a trade if the verification is successful.

Specifically, after the user's public key certificate is generated, the user may trade with the mobile bank server and the comprehensive pre-position bank server via the mobile terminal. The mobile bank server performs the verification on the encrypted user's trade information sent from the mobile terminal using the user's public key certificate, and the comprehensive pre-position bank server performs the trade if the verification is successful.

In step S103, the mobile terminal generates an updated parameter for protecting a private key after the trade is performed, sends the updated parameter for protecting the private key to the mobile bank server, receives a successful updating result from the mobile bank server, and stores the user's private key encrypted using the updated parameter for protecting the private key.

With the key protection method according to embodiments of the present disclosure, the user's public key and the user's private key are generated in the mobile terminal, the mobile bank server and the comprehensive pre-position bank server perform identify verifications on the mobile terminal, and the mobile bank server sends the user's public key to the third-party e-business verification server to be verified and signed so as to generate and store the user's public key certificate, if the mobile terminal respectively passes the identity verifications of the mobile bank server and the comprehensive pre-position bank server. Meanwhile, the mobile bank server performs the verification on the encrypted user's trade information sent from the mobile terminal using the user's public key certificate in the trade and updates the private key protection parameter of the user's private key after the trade. Thus, since the mobile bank server has performed the identify verification on the mobile terminal during the generation of the user's public key certificate, the mobile bank server knows exactly which mobile terminal to communicate with, which prevents a simulated mobile terminal from interacting with the mobile bank server, secures the safety thereof and increases the difficulty of attack. Moreover, the mobile bank server performs the verification on the encrypted user's trade information sent from the mobile terminal using the user's public key certificate in the trade, so the safety of the trade is secured, and the private key protection parameter is updated after the trade so as to encrypt and store the user's private key, thereby further securing the safety of the trade.

Step S101, step S102 and step S103 in the key protection method according to embodiments of the present disclosure as shown in FIG. 1 will be described in the following with reference to the drawings.

Figure 2:
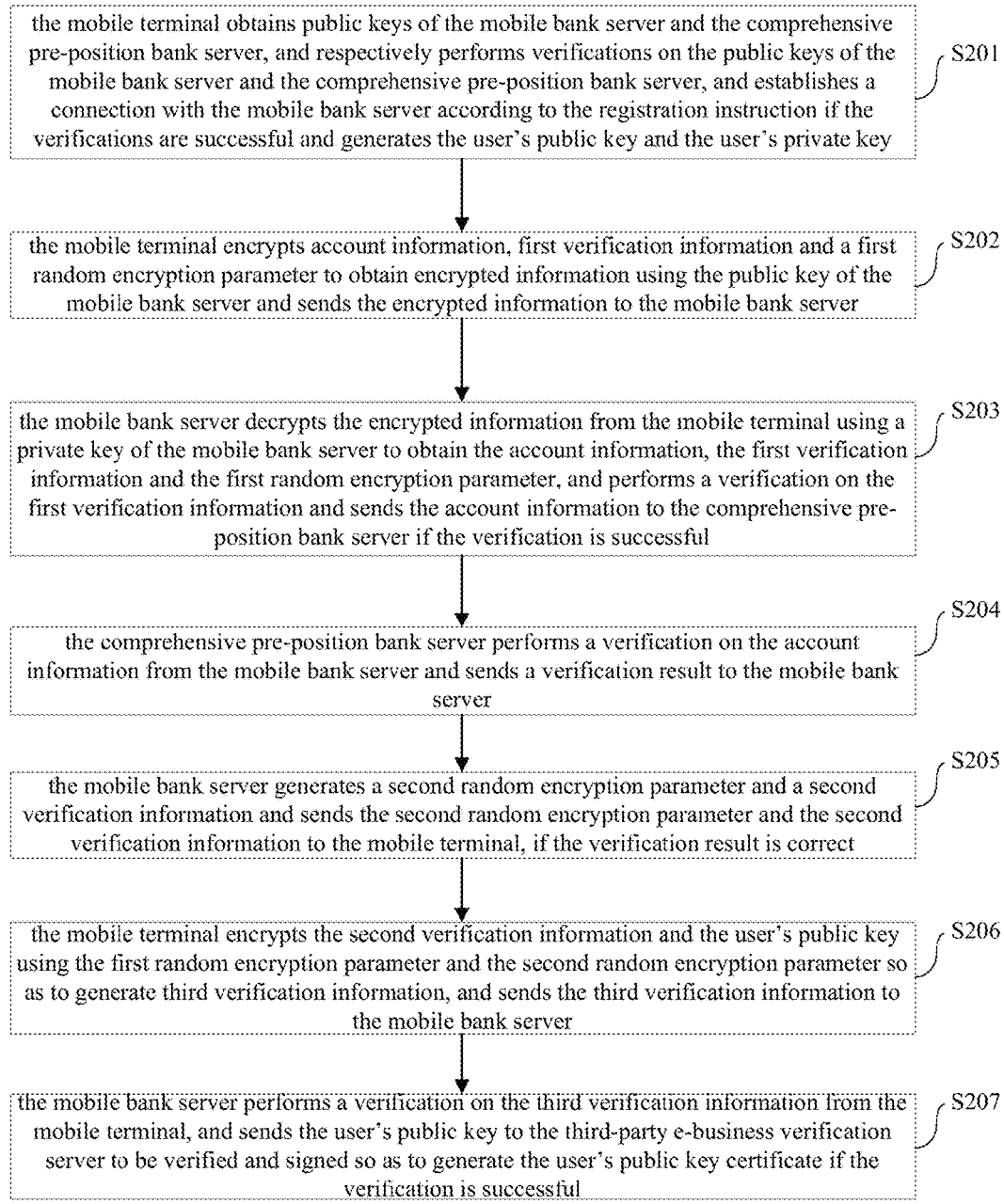
FIG. 2 is a flow chart of a method for generating a user's public key certificate according to an embodiment of the present disclosure.

FIG. 2 is flow chart of a method for generating a user's public key certificate according to an embodiment of the present disclosure.

As shown in FIG. 2, the method for generating the user's public key certificate (i.e., step S101) according to the embodiment of the present disclosure includes following steps.

In step S201, the mobile terminal obtains public keys of the mobile bank server and the comprehensive pre-position bank server, and respectively performs verifications on the public keys of the mobile bank server and the comprehensive pre-position bank server, and establishes a connection with the mobile bank server according to the registration instruction if the verifications are successful and generates the user's public key and the user's private key.

Specifically, the mobile terminal downloads the bank client software and obtains the public keys of the mobile bank server and the comprehensive pre-position bank server from the loaded software when the bank client software is installed. Root certificates of the public keys of the mobile bank server and the comprehensive pre-position bank server are preset in the mobile terminal, and it may be verified whether the public keys of the mobile bank server and the comprehensive pre-position bank server are correct using the root certificates when the mobile terminal sends a registration request, in which if the public keys of the mobile bank server and the comprehensive pre-position bank server are correct, following steps are performed; if the public keys of the mobile bank server and the comprehensive pre-position bank server are incorrect, an error message is prompted.

A private key of the mobile bank server is stored in the mobile bank server, and the public key and the private key of the mobile bank server are used to encrypt communication data between the mobile terminal and the mobile bank server; a private key of the comprehensive pre-position bank server is stored in the comprehensive pre-position bank server, and the public key and the private key of the comprehensive pre-position bank server are used to encrypt sensitive information in the trade, such as a credit card information.

Certainly, in the embodiment, after the user clicks to register, the mobile terminal may be triggered to generate a pair of the user's public key and the user's private key according to a preset key generation principle of an asymmetric cryptographic algorithm, which provides convenience for the mobile terminal to interact with the mobile bank server via the pair of the user's public key and the user's private key when the trade is performed.

In step S202, the mobile terminal encrypts account information, first verification information and a first random encryption parameter to obtain encrypted information using the public key of the mobile bank server and sends the encrypted information to the mobile bank server.

Specifically, the first verification information is generated by the mobile bank server and sent to the mobile terminal to be displayed, for the user to view and input the first verification information, in which the first verification information may be a graphic verification code so as to prevent an attack. The mobile terminal receives the first verification information (for example, characters in the graphic verification code) input by the user.

In addition, in the embodiment, the first random encryption parameter is generated by the mobile terminal randomly.

The account information includes: a phone number, a credit card number and a login password after the registration; or the account information includes: the phone number, the credit card number and a hash value of the login password after the registration.

In step S203, the mobile bank server decrypts the encrypted information from the mobile terminal using a private key of the mobile bank server to obtain the account information, the first verification information and the first random encryption parameter, and performs a verification on the first verification information and sends the account information to the comprehensive pre-position bank server if the verification is successful.

Specifically, the mobile bank server verifies whether the first verification information from the mobile terminal is consistent with the first verification information generated by itself; if yes, the verification is successful.

In addition, after the mobile bank sever obtains the encrypted information, the phone number and the first random encryption parameter in the account information are stored.

In step S204, the comprehensive pre-position bank server performs a verification on the account information from the mobile bank server and sends a verification result to the mobile bank server.

Specifically, the comprehensive pre-position bank server verifies whether the phone number and the credit card number in the account information are correct and sends the verification result thereof to the mobile bank server.

In step S205, the mobile bank server generates a second random encryption parameter and a second verification information and sends the second random encryption parameter and the second verification information to the mobile terminal, if the verification result is correct.

Specifically, if the verification result is correct, the mobile bank server encrypts the second random encryption parameter using the first random encryption parameter to obtain an encrypted second random encryption parameter, and sends the encrypted second random encryption parameter to the mobile terminal; the mobile band server further sends the second verification information to the mobile terminal in a form of short message by using the phone number stored therein.

In step S206, the mobile terminal encrypts the second verification information and the user's public key using the first random encryption parameter and the second random encryption parameter so as to generate third verification information, and sends the third verification information to the mobile bank server.

Specifically, the mobile terminal decrypts the encrypted second random encryption parameter using the first random encryption parameter to obtain the second random encryption parameter and receives the second verification information input by the user. Then, the mobile terminal encrypts the second verification information and the user's public key using the first random encryption parameter and the second random encryption parameter so as to generate the third verification information, and sends the third verification information to the mobile bank server.

In the embodiment, the mobile terminal may perform a sectionalized encryption on the second verification information and the user's public key using the first random encryption parameter and the second random encryption parameter to generate the third verification information, for example a MAC encryption algorithm may be used.

In step S207, the mobile bank server performs a verification on the third verification information from the mobile terminal, and sends the user's public key to the third-party e-business verification server to be verified and signed so as to generate the user's public key certificate if the verification is successful.

Specifically, the third-party e-business verification server verifies and signs the user's public key so as to prevent the user's public key from being simulated and stores the user's public key signed thereby in the mobile bank server. The mobile bank server indicates that the user's public key certificate is generated successfully after storing the user's public key certificate signed by the third-party e-business verification server.

With the method for generating the user's public key certificate according to embodiments of the present disclosure, before the mobile terminal generates the user's public key and the user's private key and sends user information and the user's public key to the mobile bank server, the mobile terminal has verifications with the mobile bank server and the comprehensive pre-position bank server, and the user's public key is stored in the mobile bank server in a form of digital certificate after the verifications, so as to secure safety of a transmission path of the user's public key and increase the difficulty of attack.

Figure 3:
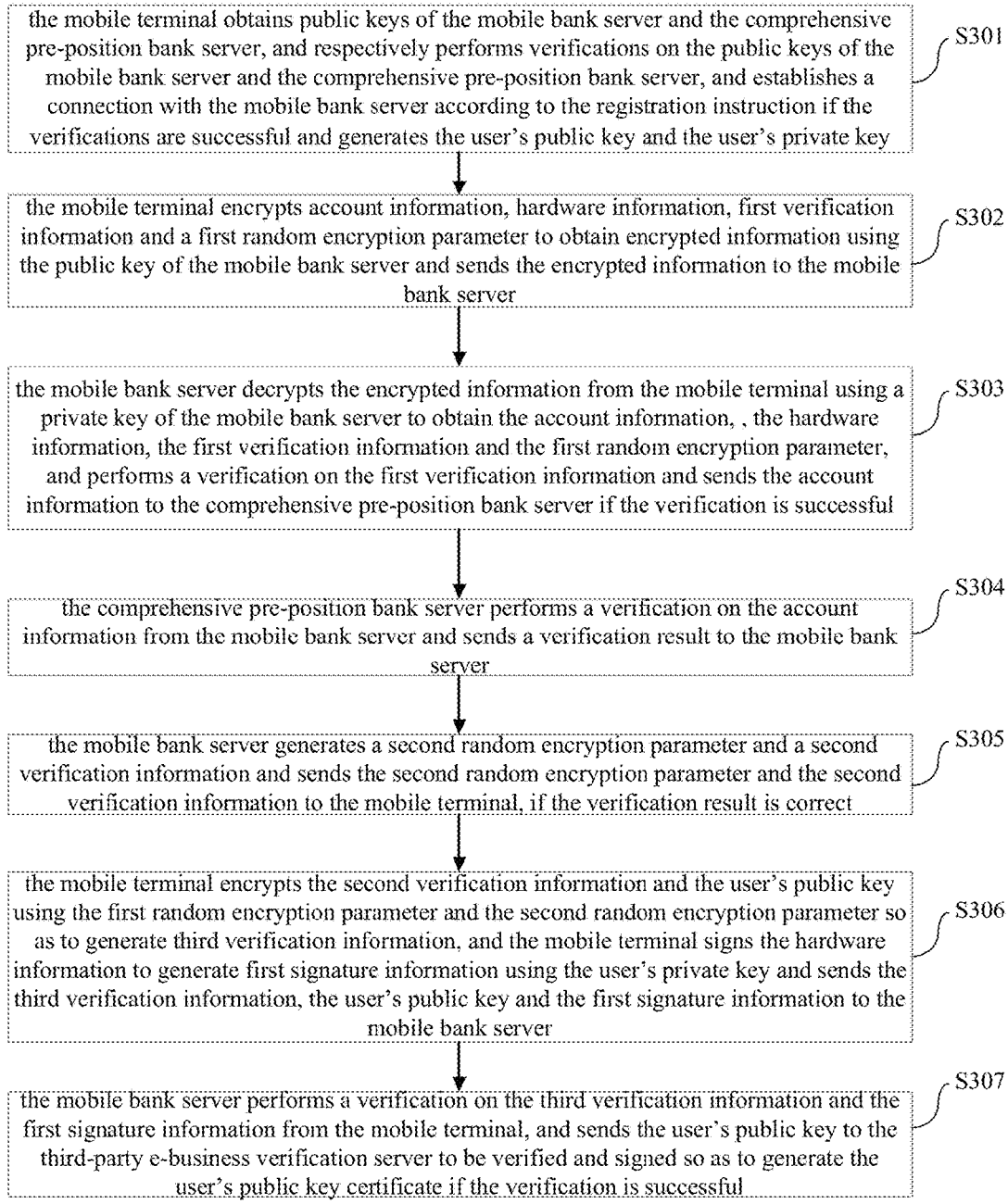
FIG. 3 is a flow chart of a method for generating a user's public key certificate according to another embodiment of the present disclosure.

FIG. 3 is a flow chart of a method for generating a user's public key according to another embodiment of the present disclosure.

As shown in FIG. 3, the method for generating the user's public key according to the embodiment of the present disclosure includes following steps.

In step S301, the mobile terminal obtains public keys of the mobile bank server and the comprehensive pre-position bank server, and respectively performs verifications on the public keys of the mobile bank server and the comprehensive pre-position bank server, and establishes a connection with the mobile bank server according to the registration instruction if the verifications are successful and generates the user's public key and the user's private key.

Specifically, the mobile terminal downloads the bank client software and obtains the public keys of the mobile bank server and the comprehensive pre-position bank server from the loaded software when the bank client software is installed. Root certificates of the public keys of the mobile bank server and the comprehensive pre-position bank server are preset in the mobile terminal, and it may be verified whether the public keys of the mobile bank server and the comprehensive pre-position bank server are correct using the root certificates when the mobile terminal sends a registration request, in which if the public keys of the mobile bank server and the comprehensive pre-position bank server are correct, following steps are performed; if the public keys of the mobile bank server and the comprehensive pre-position bank server are incorrect, an error message is prompted.

A private key of the mobile bank server is stored in the mobile bank server, and the public key and the private key of the mobile bank server are used to encrypt communication data between the mobile terminal and the mobile bank server; a private key of the comprehensive pre-position bank server is stored in the comprehensive pre-position bank server, and the public key and the private key of the comprehensive pre-position bank server are used to encrypt sensitive information in the trade, such as a credit card information.

Certainly, in the embodiment, after the user clicks to register, the mobile terminal may be triggered to generate a pair of the user's public key and the user's private key according to a preset key generation principle of an asymmetric cryptographic algorithm, which provides convenience for the mobile terminal to interact with the mobile bank server via the pair of the user's public key and the user's private key when the trade is performed.

In step S302, the mobile terminal encrypts account information, hardware information, first verification information and a first random encryption parameter to obtain encrypted information using the public key of the mobile bank server and sends the encrypted information to the mobile bank server.

Specifically, the first verification information is generated by the mobile bank server and sent to the mobile terminal to be displayed, for the user to view and input the first verification information, in which the first verification information may be a graphic verification code so as to prevent an attack. The mobile terminal receives the first verification information (for example, characters in the graphic verification code) input by the user.

In addition, in the embodiment, the first random encryption parameter is generated by the mobile terminal randomly.

The account information includes: a phone number, a credit card number and a login password after the registration; or the account information includes: the phone number, the credit card number and a hash value of the login password after the registration.

The hardware information is hardware characteristic information or a hash value of the hardware characteristic information and the hardware characteristic information includes a device serial number and/or a MAC address of network card.

Specifically, the mobile terminal extracts the hardware characteristic information of its own (or calculates the hash value of the hardware characteristic information extracted by the mobile terminal) and generates the first random encryption parameter simultaneously, and receives the phone number, the credit card number, the login password (the user may be prompted to input the password twice) and characters presented in the graphic verification code input by the user. After the user clicks to submit the above information, the mobile terminal encrypts the obtained information (which includes the phone number, the credit card number, the login password, the hardware characteristic information or the hash value of the hardware characteristic information, the first random encryption parameter and the graphic verification code) using the public key of the mobile bank server to obtain encrypted information and sends the encrypted information to the mobile bank server.

Certainly, at this time, the mobile terminal may calculate a hash value of the login password. After the user clicks to submit the above information, the mobile terminal encrypts the obtained information (which includes the phone number, the credit card number, the hash value of the login password, the hardware characteristic information or the hash value of the hardware characteristic information, the first random encryption parameter and the graphic verification code) using the public key of the mobile bank server to obtain encrypted information and sends the encrypted information to the mobile bank server.

In step S303, the mobile bank server decrypts the encrypted information from the mobile terminal using a private key of the mobile bank server to obtain the account information, the hardware information, the first verification information and the first random encryption parameter, and performs a verification on the first verification information and sends the account information to the comprehensive pre-position bank server if the verification is successful.

Specifically, the mobile bank server verifies whether the first verification information from the mobile terminal is consistent with the first verification information generated by itself; if yes, the verification is successful.

In addition, after the mobile bank sever obtains the encrypted information, the phone number, the hardware information and the first random encryption parameter in the account information are stored.

In step S304, the comprehensive pre-position bank server performs a verification on the account information from the mobile bank server and sends a verification result to the mobile bank server.

Specifically, the comprehensive pre-position bank server verifies whether the phone number and the credit card number in the account information are correct and sends the verification result thereof to the mobile bank server.

In step S305, the mobile bank server generates a second random encryption parameter and a second verification information and sends the second random encryption parameter and the second verification information to the mobile terminal, if the verification result is correct.

Specifically, if the verification result is correct, the mobile bank server encrypts the second random encryption parameter using the first random encryption parameter to obtain an encrypted second random encryption parameter, and sends the encrypted second random encryption parameter to the mobile terminal; the mobile band server further sends the second verification information to the mobile terminal in a form of short message by using the phone number stored therein.

In step S306, the mobile terminal encrypts the second verification information and the user's public key using the first random encryption parameter and the second random encryption parameter so as to generate third verification information, and the mobile terminal signs the hardware information to generate first signature information using the user's private key and sends the third verification information, the user's public key and the first signature information to the mobile bank server.

Specifically, the mobile terminal decrypts the encrypted second random encryption parameter using the first random encryption parameter to obtain the second random encryption parameter, and receives the second verification information input by the user. Then, the mobile terminal encrypts the second verification information input by the user and the user's public key to generate the third verification information using the first random encryption parameter and the second random encryption parameter, signs the hardware characteristic information or the hash value of the hardware characteristic information to generate the first signature information using the user's private key and sends the third verification information, the user's public key and the first signature information to the mobile bank server.

In the embodiment, the mobile terminal may perform a sectionalized encryption on the second verification information and the user's public key using the first random encryption parameter and the second random encryption parameter to generate the third verification information, for example a MAC encryption algorithm may be used.

In step 307, the mobile bank server performs a verification on the third verification information and the first signature information from the mobile terminal, and sends the user's public key to the third-party e-business verification server to be verified and signed so as to generate the user's public key certificate if the verification is successful.

Specifically, the mobile bank server encrypts the second verification information and the user's public key to obtain fourth verification information using the first random encryption parameter and the second random encryption parameter stored therein, performs a signature verification on the first signature information using the user's public key, and determines whether the third verification information is consistent with the fourth verification information and whether the signature verification is successful, in which if the third verification information is consistent with the fourth verification information and the signature verification is successful, the verification is successful.

The third-party e-business verification server verifies and signs the user's public key so as to prevent the user's public key from being simulated and stores the user's public key signed thereby in the mobile bank server. The mobile bank server indicates that the user's public key certificate is generated successfully after storing the user's public key certificate signed by the third-party e-business verification server.

With the method for generating the user's public key certificate according to embodiments of the present disclosure, before the mobile terminal generates the user's public key and the user's private key and sends user information and the user's public key to the mobile bank server, the mobile terminal has verifications with the mobile bank server and the comprehensive pre-position bank server, and the user's public key is stored in the mobile bank server in a form of digital certificate after the verifications, so as to secure safety of a transmission path of the user's public key and increase the difficulty of attack. Moreover, since the mobile bank server verifies the hardware information of the mobile terminal, the mobile bank server exactly knows which mobile terminal to communicate with, which prevents the simulated mobile terminal from interacting with the mobile bank server and ensures the safety thereof.

Figure 4:
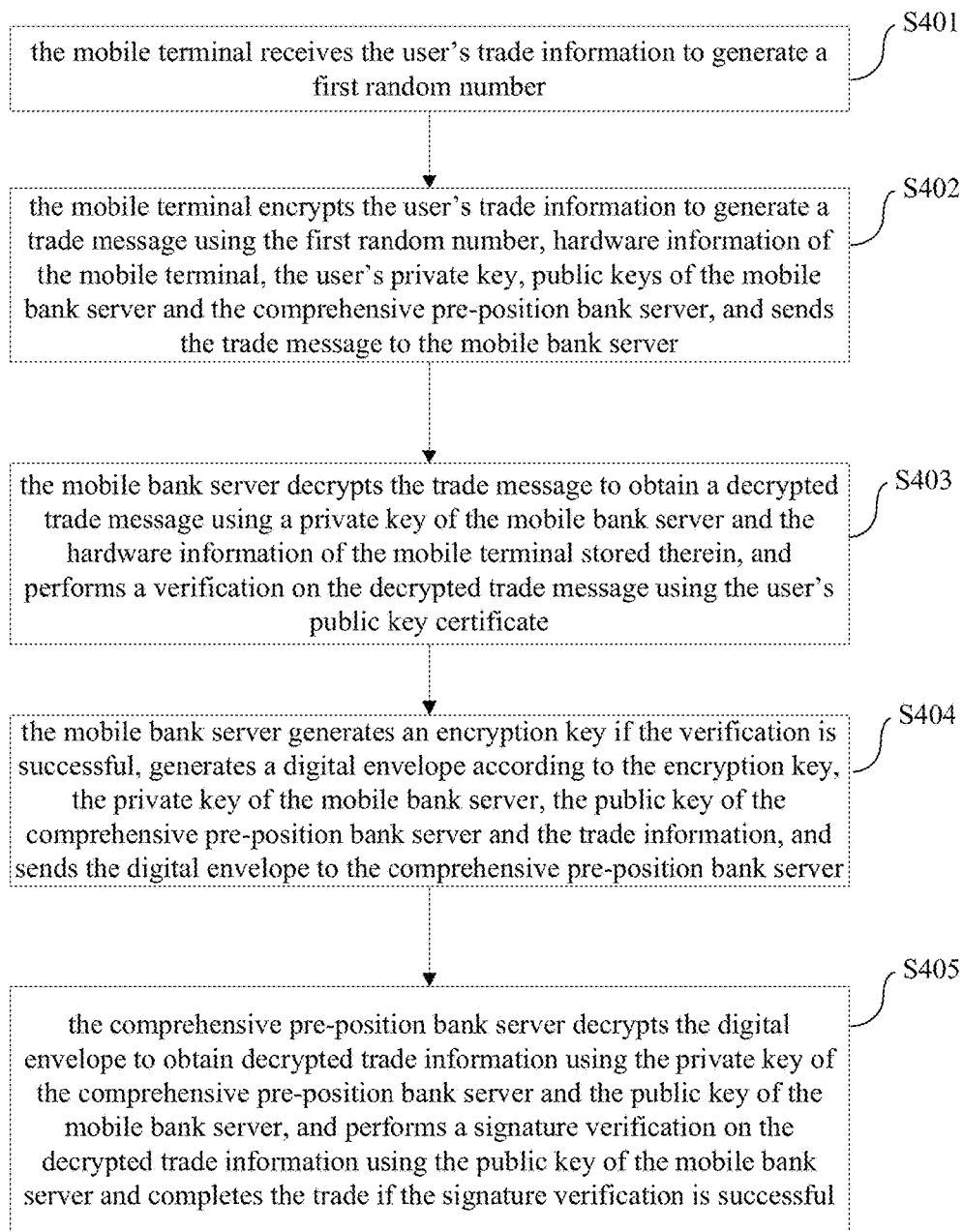
FIG. 4 is a flow chart of a trade method according to an embodiment of the present disclosure.

FIG. 4 is a flow chart of a trade method according to an embodiment of the present disclosure.

As shown in FIG. 4, the trade method (i.e., step S102) according to the embodiment of the present disclosure includes following steps.

In step S401, the mobile terminal receives the user's trade information to generate a first random number.

Specifically, the user's trade information includes at least a trade account and a trade amount.

In step S402, the mobile terminal encrypts the user's trade information to generate a trade message using the first random number, hardware information of the mobile terminal, the user's private key, public keys of the mobile bank server and the comprehensive pre-position bank server, and sends the trade message to the mobile bank server, in which the hardware information is hardware characteristic information or a hash value of the hardware characteristic information and the hardware characteristic information includes a device serial number and/or a MAC address of network card.

In step S403, the mobile bank server decrypts the trade message to obtain a decrypted trade message using a private key of the mobile bank server and the hardware information of the mobile terminal stored therein, and performs a verification on the decrypted trade message using the user's public key certificate.

In step S404, the mobile bank server generates an encryption key if the verification is successful, generates a digital envelope according to the encryption key, the private key of the mobile bank server, the public key of the comprehensive pre-position bank server and the trade information, and sends the digital envelope to the comprehensive pre-position bank server. If the verification is unsuccessful, the mobile bank server prompts the user that the verification in mobile bank server is failed.

In step S405, the comprehensive pre-position bank server decrypts the digital envelope to obtain decrypted trade information using the private key of the comprehensive pre-position bank server and the public key of the mobile bank server, and performs a signature verification on the decrypted trade information using the public key of the mobile bank server and completes the trade if the signature verification is successful.

With the trade method according to embodiments of the present disclosure, in the mobile terminal, the user's trade information is encrypted to generate the trade message using the first random number, the hardware information of the mobile terminal, the user's private key, the public keys of the mobile bank server and the comprehensive pre-position bank server, and in the mobile bank server, the trade message is verified, so it can be ensured that the trade information received by the comprehensive pre-position bank server is from a safe terminal used by the user, and also a safe transmission of the trade information among the mobile terminal, the mobile bank server and the comprehensive pre-position bank server can be ensured, thus ensuring the safety of a mobile payment.

Figure 5:
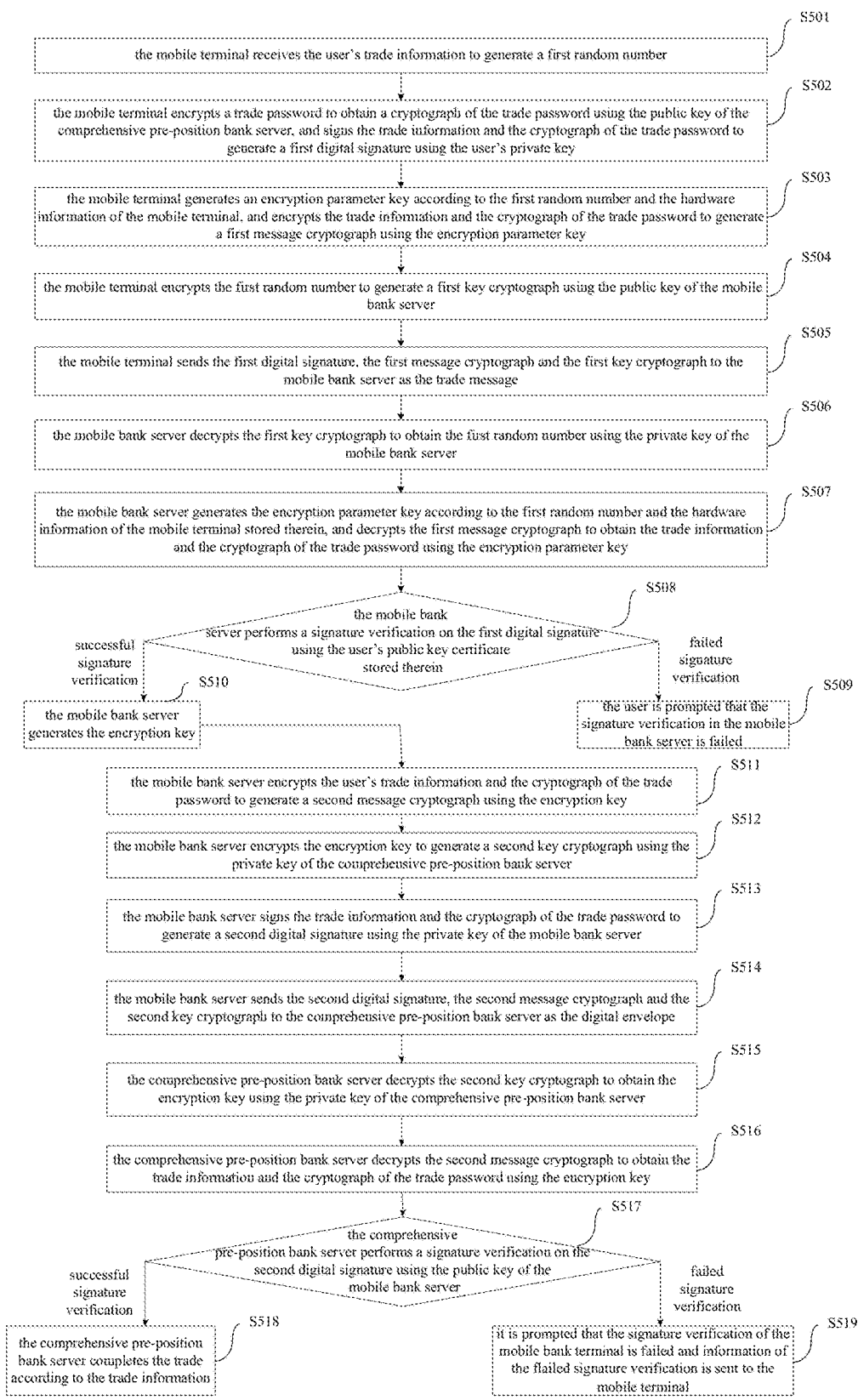
FIG. 5 is a flow chart of a trade method according to another embodiment of the present disclosure.

FIG. 5 is a flow chart of a trade method according to another embodiment of the present disclosure.

As shown in FIG. 5, the trade method (i.e., step S102) according to the embodiment of the present disclosure includes following steps.

In step S501, the mobile terminal receives the user's trade information to generate a first random number.

Whenever a trade message process is performed, the first random number is generated, and the generated first random number in each time is different from each other.

Specifically, the user's trade information includes at least a trade account and a trade amount.

In step S502, the mobile terminal encrypts a trade password to obtain a cryptograph of the trade password using the public key of the comprehensive pre-position bank server, and signs the trade information and the cryptograph of the trade password to generate a first digital signature using the user's private key.

The cryptograph of the trade password may be generated by encrypting the trade password using the public key of the comprehensive pre-position bank server, and the safety of the trade password can be ensured by encrypting the trade password, so it is ensured that an electronic channel cannot be fallen to the ground (i.e. during an information transmission, only a sender and a receiver may know plaintexts of information, and other terminals may only know an encrypted text) in the whole course. Certainly, in the embodiment, the mobile terminal may encrypt a hash value of the trade password to obtain the cryptograph of the trade password using the public key of the comprehensive pre-position bank server.

In step S503, the mobile terminal generates an encryption parameter key according to the first random number and the hardware information of the mobile terminal, and encrypts the trade information and the cryptograph of the trade password to generate a first message cryptograph using the encryption parameter key.

Specifically, the mobile terminal extracts the hardware characteristic information of the mobile terminal and calculates the hash value of the hardware characteristic information, generates the encryption parameter key according to the first random number and the hardware information of the mobile terminal (or hash value of the hardware characteristic information), and encrypts the trade information and the cryptograph of the trade password to generate the first message cryptograph using the encryption parameter key. The mobile terminal may use 3DES (Triple Data Encryption Standard) or AES (Advanced Encryption Standard) to encrypt the trade information and the cryptograph of the trade password to generate the first message cryptograph using the encryption parameter key.

In step S504, the mobile terminal encrypts the first random number to generate a first key cryptograph using the public key of the mobile bank server.

It should be noted that, step S502, step S503 and step S504 may be executed in no particular order.

In step S505, the mobile terminal sends the first digital signature, the first message cryptograph and the first key cryptograph to the mobile bank server as the trade message.

Above steps are encryption processes before sending the trade information to the mobile bank server by the mobile terminal, and after the mobile bank server receives the trade message from the mobile terminal, following processes are executed, i.e., the mobile bank server encrypts the trade message from the mobile terminal.

In step S506, the mobile bank server decrypts the first key cryptograph to obtain the first random number using the private key of the mobile bank server.

In step S507, the mobile bank server generates the encryption parameter key according to the first random number and the hardware information of the mobile terminal stored therein, and decrypts the first message cryptograph to obtain the trade information and the cryptograph of the trade password using the encryption parameter key.

Specifically, the mobile terminal calculates and obtains the encryption parameter key again according to the first random number and the hardware information of the mobile terminal stored therein or according to the first random number and the hash value of the hardware information of the mobile terminal stored therein. The mobile bank server uses the encryption parameter key calculated by itself to decrypt the first message cryptograph from the mobile terminal, so as to obtain the trade information and the cryptograph of the trade password.

In step S508, the mobile bank server performs a signature verification on the first digital signature using the user's public key certificate stored therein.

Specifically, the mobile bank server obtains the user's public key from the user's public key certificate and performs the signature verification on the first digital signature by using the user's public key.

In step S509, if the signature verification is failed, the user is prompted that the signature verification in the mobile bank server is failed.

In step S510, if the signature verification is successful, the mobile bank server generates the encryption key.

The encryption key may be a symmetric encryption key.

Specifically, if the signature verification is successful, it is indicated that the trade message is from the reliable mobile terminal, and following steps are executed. The following steps are encryption processes of the trade information by the mobile bank server.

In step S511, the mobile bank server encrypts the user's trade information and the cryptograph of the trade password to generate a second message cryptograph using the encryption key.

In step S512, the mobile bank server encrypts the encryption key to generate a second key cryptograph using the private key of the comprehensive pre-position bank server.

An encryption mode of the mobile bank server encrypting the encryption key may be the same with that of the mobile terminal encrypting the trade information.

In step S513, the mobile bank server signs the trade information and the cryptograph of the trade password to generate a second digital signature using the private key of the mobile bank server.

In step S514, the mobile bank server sends the second digital signature, the second message cryptograph and the second key cryptograph to the comprehensive pre-position bank server as the digital envelope.

After the comprehensive pre-position bank server receives the digital envelope, following steps are executed. Following steps are decryption processes of the information from the mobile bank server by the comprehensive pre-position bank server.

In step S515, the comprehensive pre-position bank server decrypts the second key cryptograph to obtain the encryption key using the private key of the comprehensive pre-position bank server.

In step S516, the comprehensive pre-position bank server decrypts the second message cryptograph to obtain the trade information and the cryptograph of the trade password using encryption key.

In order to ensure the safety of the trade password and ensure that the electronic channel cannot be fallen to the ground (i.e. during an information transmission, only a sender and a receiver may know plaintexts of information, and other terminals may only know an encrypted text) in the whole course, the trade password is transmitted from the mobile terminal and the mobile bank server to the comprehensive pre-position bank server in a form of cryptograph. After obtaining the cryptograph of the trade password, the comprehensive pre-position bank server may decrypt the cryptograph of the trade password to obtain the trade password using the private key of the comprehensive pre-position bank server, and sends the trade password to a back-end banking system.

In step S517, the comprehensive pre-position bank server performs a signature verification on the second digital signature using the public key of the mobile bank server.

In step S518, if the signature verification is successful, the comprehensive pre-position bank server completes the trade according to the trade information.

In step S519, if the signature verification is failed, the comprehensive pre-position bank server prompts the signature verification failure for the mobile bank server and information of the flailed signature verification is sent to the mobile terminal.

With the trade method according to the embodiment of the present disclosure, the safe transmission of the trade information among the mobile terminal, the mobile bank server and the comprehensive pre-position bank server is further ensured, thus further ensuring the safety of the mobile payment.

Figure 6:
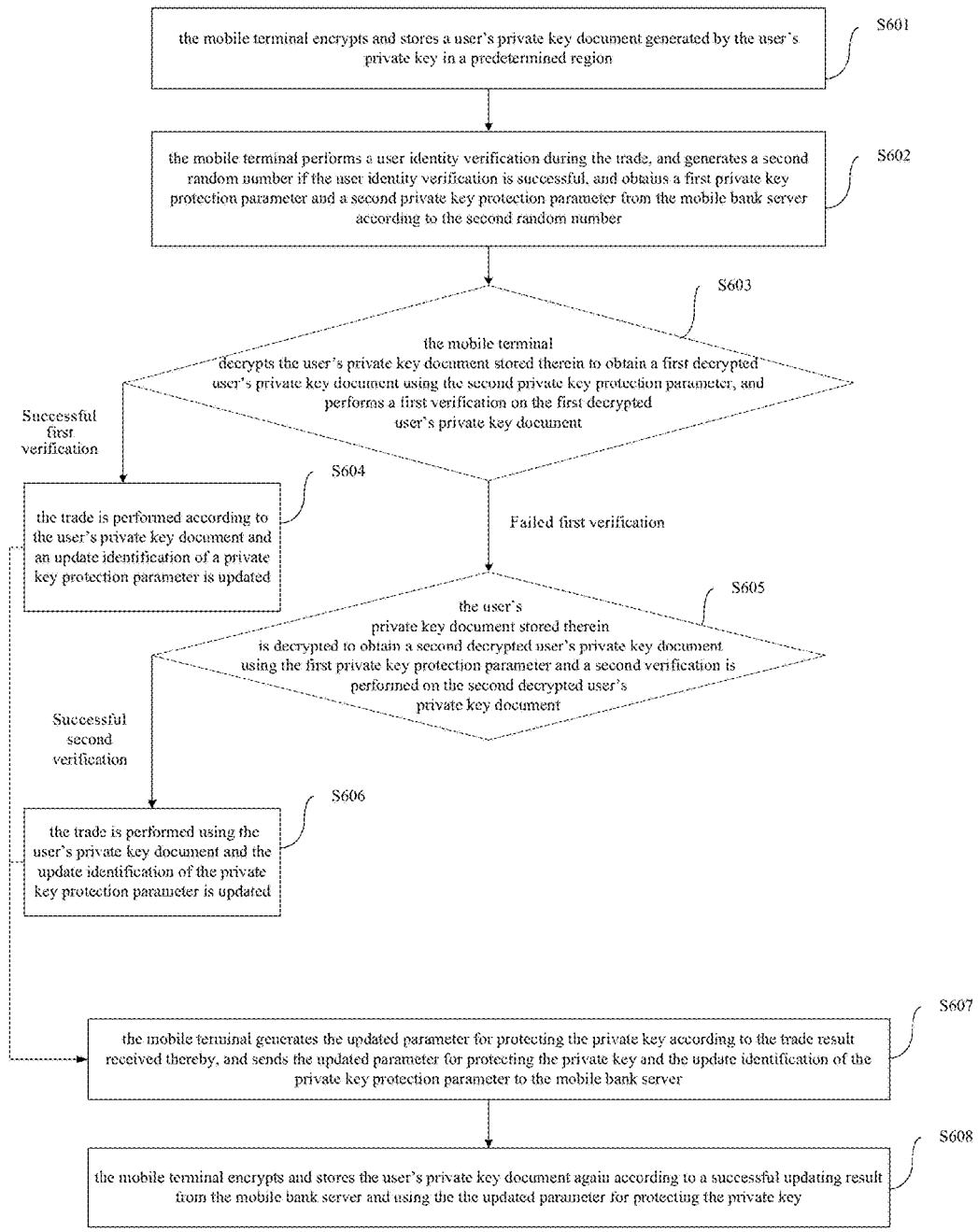
FIG. 6 is a flow chart of a method for storing a user's private key according to an embodiment of the present disclosure.

FIG. 6 is a flow chart of a method for storing a user's private key according to an embodiment of the present disclosure.

As shown in FIG. 6, the method for storing the user's private key (i.e., step S103) according to the embodiment of the present disclosure includes following steps.

In step S601, the mobile terminal encrypts and stores a user's private key document generated by the user's private key in a predetermined region.

The user's private key document includes the user's private key and hardware information of the mobile terminal, and the protection key of the user's private key is generated by all or partial information of the hardware information or a hash value of hardware characteristic information, all or partial information of a login password or a hash value of the login password and the private key protection parameter.

In step S602, the mobile terminal performs a user identity verification during the trade, and generates a second random number if the user identity verification is successful, and obtains a first private key protection parameter and a second private key protection parameter from the mobile bank server according to the second random number.

Specifically, in each payment through transfer, the mobile terminal receives payment information input by the user, and verifies an identity of the user first using the payment information. The mobile terminal may verifies the identity of the user using a verification of a message verification code, a verification of a dynamic password, a verification of an electronic signature token or a verification of a trade password.

Furthermore, the mobile terminal encrypts the second random number to obtain an encrypted second random number using the public key of the mobile bank server, and sends the encrypted second random number to the mobile bank server; the mobile bank server decrypts encrypted information from the mobile terminal to obtain the second random number using the private key of the mobile bank server; the mobile bank server encrypts the first private key protection parameter and the second private key protection parameter to obtain an encrypted first private key protection parameter and an encrypted second private key protection parameter using the second random number, and sends the encrypted first private key protection parameter and the encrypted second private key protection parameter to the mobile terminal; the mobile terminal decrypts information from the mobile bank server to obtain the first private key protection parameter and the second private key protection parameter using the second random number.

In an above manner, safe transmissions of the first private key protection parameter and the second private key protection parameter between the mobile terminal and the mobile bank server can be ensured.

The first private key protection parameter and the second private key protection parameter obtained from the mobile bank server from the first time may be given a same value in the registration.

In step S603, the mobile terminal decrypts the user's private key document stored therein to obtain a first decrypted user's private key document using the second private key protection parameter, and performs a first verification on the first decrypted user's private key document.

Certainly, the mobile terminal may perform the verification on the first decrypted user's private key document using the hardware information, so as to improve the safety.

In step S604, the trade is performed using the user's private key document and an update identification of a private key protection parameter is updated if the first verification is successful.

The update identification of the private key protection parameter may be updated according to the first private key protection parameter configured to decrypt the user's private key document.

In step S605, the user's private key document stored therein is decrypted to obtain a second decrypted user's private key document using the first private key protection parameter and a second verification is performed on the second decrypted user's private key document if the first verification is not successful.

Certainly, the mobile terminal may perform the verification on the second decrypted user's private key document using the hardware information, so as to improve the safety.

In step S606, the trade is performed using the user's private key document and the update identification of the private key protection parameter is updated if the second verification is successful.

The update identification of the private key protection parameter may be updated according to the second private key protection parameter configured to decrypt the user's private key document.

In the step, if the second verification is failed, error information is feedback, and in this time, the user needs to register again to perform the trade.

The mobile terminal updates the update identification of the private key protection parameter according to a result of the verification, which further includes: if the user's private key document stored therein is decrypted using the second private key protection parameter and the first verification is successful, the update identification of the private key protection parameter may be updated according to the second private key protection parameter configured to decrypt the user's private key document, for example the update identification of the private key protection parameter is updated to 2; if the user's private key document stored therein is decrypted using the first private key protection parameter and the second verification is successful, the update identification of the private key protection parameter may be updated according to the first private key protection parameter configured to decrypt the user's private key document, for example the update identification of the private key protection parameter is updated to 1.

In step S607, the mobile terminal generates the updated parameter for protecting the private key according to the trade result received thereby, and sends the updated parameter for protecting the private key and the update identification of the private key protection parameter to the mobile bank server.

No matter what the trade result is, the mobile terminal generates the updated parameter for protecting the private key.

Specifically, the mobile terminal encrypts the updated parameter for protecting the private key and the update identification of the private key protection parameter using the public key of the mobile bank server, and sends an encrypted updated parameter for protecting the private key and an encrypted update identification of the private key protection parameter to the mobile bank server; accordingly, the mobile bank server decrypts information from the mobile terminal to obtain the updated parameter for protecting the private key and the update identification of the private key protection parameter using the private key of the mobile bank server. The above process is performed in a manner of encrypted transmission to ensure the safety thereof.

In addition, the mobile bank server updates the first private key protection parameter and the second private key protection parameter using the update identification of the private key protection parameter. Specifically, the mobile bank server updates the second private key protection parameter using the updated parameter for protecting the private key and updates the first private key protection parameter using the second private key protection parameter, if the update identification of the private key protection parameter is an identification corresponding to the second private key protection parameter; the mobile bank server updates the second private key protection parameter using the updated parameter for protecting the private key, if the update identification of the private key protection parameter is an identification corresponding to the first private key protection parameter.

In addition, the mobile bank server returns a successful updating result to the mobile terminal after the mobile bank server updates the private key protection parameter.

In step S608, the mobile terminal encrypts and stores the user's private key document again according to a successful updating result from the mobile bank server and using the updated parameter for protecting the private key.

Specifically, after receiving the successful updating result, the mobile terminal updates the private key protection parameter, all or partial information of the hardware information of the mobile terminal or the hash value of hardware characteristic information and all or partial information of the login password or the hash value of the login password, and encrypts the user's private key document using the protection key of the user's private key.

If the mobile bank server fails to update the private key protection parameter, according to a failed verification result of the mobile bank server, the mobile terminal does not encrypt and store the user's private key document by using the updated parameter for protecting the private key generated in step S607, but encrypts and stores the user's private key document in an original manner which may be a manner of encrypting and storing the user's private key document using the protection key of the user's private key in step S601.

With the method for storing the user's private key according to the embodiment of the present disclosure, the mobile terminal obtains the private key protection parameter from the mobile bank server, and verifies whether the user's private key document can be successfully decrypted by the private key protection parameter. After the successful verification, the trade is performed, and thus the user's private key cannot be cracked and the safety is ensured.

Figure 7:
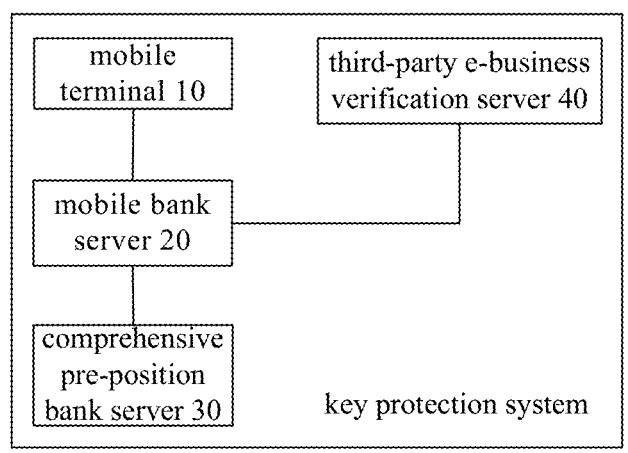
FIG. 7 is a block diagram of a key protection system according to an embodiment of the present disclosure.

FIG. 7 is a block diagram of a key protection system according to an embodiment of the present disclosure.

As shown in FIG. 7, the key protection system includes a mobile terminal 10, a mobile bank server 20, a comprehensive pre-position bank server 30 and a third-party e-business verification server 40.

Specifically, the mobile terminal 10 is configured to receive a registration instruction and to generate a user's public key and a user's private key according to the registration instruction. In an embodiment of the present disclosure, the mobile terminal 10 downloads a bank client software and is registered via the bank client software. After receiving the registration instruction of the user, the mobile terminal 10 generates the user's public key and the user's private key.

The mobile bank server 20 is configured to send the user's public key to the third-party e-business verification server 40 to be verified and signed so as to generate and store a user's public key certificate during a registration of the mobile terminal 10. The mobile bank server 20 and the comprehensive pre-position bank server 30 perform the identify verifications on the mobile terminal 10 during the registration of the mobile terminal 10. If the mobile terminal 10 respectively passes the identity verifications of the mobile bank server 20 and the comprehensive pre-position bank server 30, the mobile bank server 20 sends the user's public key to the third-party e-business verification server 40 to be verified and signed so as to generate and store the user's public key certificate, in which the user's public key certificate is stored in the mobile bank server 20.

The mobile bank server 20 is further configured to perform a verification on an encrypted user's trade information sent from the mobile terminal 10 using the user's public key certificate, and the comprehensive pre-position bank server 30 is configured to perform a trade if the verification is successful. After the user's public key certificate is generated, the user may trade with the mobile bank server 20 and the comprehensive pre-position bank server 30 via the mobile terminal 10. The mobile bank server 20 performs the verification on the encrypted user's trade information sent from the mobile terminal 10 using the user's public key certificate, and the comprehensive pre-position bank server 30 performs the trade if the verification is successful.

The mobile terminal 10 is further configured to generate an updated parameter for protecting a private key after the trade is performed, to send the updated parameter for protecting the private key to the mobile bank server 20, to receive a successful updating result from the mobile bank server 20 and to encrypt and store the user's private key using the updated parameter for protecting the private key.

With the key protection system according to embodiments of the present disclosure, the user's public key and the user's private key are generated in the mobile terminal, the mobile bank server and the comprehensive pre-position bank server perform identify verifications on the mobile terminal, and the mobile bank server sends the user's public key to the third-party e-business verification server to be verified and signed so as to generate and store the user's public key certificate, if the mobile terminal respectively passes the identity verifications of the mobile bank server and the comprehensive pre-position bank server. Meanwhile, the mobile bank server performs the verification on the encrypted user's trade information sent from the mobile terminal using the user's public key certificate in the trade and updates the private key protection parameter of the user's private key after the trade. Thus, since the mobile bank server has performed the identify verification on the mobile terminal during the generation of the user's public key certificate, the mobile bank server knows exactly which mobile terminal to communicate with, which prevents a simulated mobile terminal from interacting with the mobile bank server, secures the safety thereof and increases the difficulty of attack. Moreover, the mobile bank server performs the verification on the encrypted user's trade information sent from the mobile terminal using the user's public key certificate in the trade, so the safety of the trade is secured, and the private key protection parameter is updated after the trade so as to encrypt and store the user's private key, thereby further securing the safety of the trade.

In the key protection system, first it is needed to generate the user's public key certificate, and an embodiment thereof is as follows.

The mobile terminal 10 is further configured to obtain public keys of the mobile bank server 20 and the comprehensive pre-position bank server 30, to respectively perform verifications on the public keys of the mobile bank server 20 and the comprehensive pre-position bank server 30, to establish a connection with the mobile bank server 20 according to the registration instruction if the verifications are successful, to generate the user's public key and the user's private key, to encrypt account information, first verification information and a first random encryption parameter to obtain encrypted information using the public key of the mobile bank server 20 and to send the encrypted information to the mobile bank server 20.

The mobile bank server 20 is further configured to decrypt the encrypted information from the mobile terminal 10 using a private key of the mobile bank server 20 to obtain the account information, the first verification information and the first random encryption parameter, to perform a verification on the first verification information and to send the account information to the comprehensive pre-position bank server 30 if the verification is successful;

The comprehensive pre-position bank server 30 is further configured to perform a verification on the account information from the mobile bank server 20 and to send a verification result to the mobile bank server 20.

If the verification result is correct, the mobile bank server 20 is further configured to generate a second random encryption parameter and a second verification information, and to send the second random encryption parameter and the second verification information to the mobile terminal 10. The mobile terminal 10 is further configured to encrypt the second verification information and the user's public key using the first random encryption parameter and the second random encryption parameter so as to generate third verification information, and to send the third verification information to the mobile bank server 20. The mobile bank server 20 is further configured to perform a verification on the third verification information from the mobile terminal 10, and to send the user's public key to the third-party e-business verification server 40 to be verified and signed so as to generate the user's public key certificate if the verification is successful.

The mobile terminal 10 is further configured to encrypt hardware information of the mobile terminal 10 using the public key of the mobile bank server 20, in which the hardware information is hardware characteristic information or a hash value of the hardware characteristic information and the hardware characteristic information includes a device serial number and/or a MAC address of network card.

The account information includes a phone number, a credit card number and a login password.

The mobile terminal 10 is further configured to: receive the first verification information generated by the mobile bank server 20, in which the first verification information is a graphic verification code, and encrypt the phone number, the credit card number, the hash value of the login password calculated thereby, the hardware information, the first random encryption parameter and the first verification information to obtain an encrypted information using the public key of the mobile bank server 20, and to send the encrypted information to the mobile bank server 20, in which the first random encryption parameter is generated by the mobile terminal 10.

The mobile bank server 20 is further configured to encrypt the second random encryption parameter to obtain an encrypted second random encryption parameter using the first random encryption parameter, to send the encrypted second random encryption parameter to the mobile terminal 10, and to send the second verification information to the mobile terminal 10 in a text message.

After the second random encryption parameter and the second verification information are sent to the mobile terminal 10, the mobile terminal 10 is further configured to decrypt the encrypted second random encryption parameter using the first random encryption parameter to obtain the second random encryption parameter and to receive the second verification information input by a user.

The mobile terminal 10 is further configured to encrypt the second verification information and the user's public key to generate the third verification information using the first random encryption parameter and the second random encryption parameter, to sign the hardware information to generate first signature information using the user's private key and to send the third verification information, the user's public key and the first signature information to the mobile bank server 20.

The mobile bank server 20 is further configured to encrypt the second verification information and the user's public key to generate fourth verification information using the first random encryption parameter and the second random encryption parameter stored therein, and to perform a signature verification on the first signature information using the user's public key, and to determine whether the third verification information is consistent with the fourth verification information and whether the signature verification is successful, in which if the third verification information is consistent with the fourth verification information and the signature verification is successful, the verification is passed.

The mobile terminal 10 is further configured to perform a sectionalized encryption on the second verification information and the user's public key using the first random encryption parameter and the second random encryption parameter, for example a MAC encryption algorithm may be used.

In the key protection system, the trade is performed after the user's public key certificate is generated, and an embodiment thereof is as follows.

The mobile terminal 10 is further configured to receive the user's trade information to generate a first random number, in which the user's trade information of user includes at least a trade account and a trade amount, to encrypt the user's trade information to generate a trade message using the first random number, hardware information of the mobile terminal, the user's private key, public keys of the mobile bank server 20 and the comprehensive pre-position bank server 30, and to send the trade message to the mobile bank server 20, in which the hardware information is hardware characteristic information or a hash value of the hardware characteristic information.

The mobile bank server 20 is further configured to decrypt the trade message using a private key of the mobile bank server 20 and the hardware information of the mobile terminal 10 stored therein to obtain a decrypted trade message, to perform a verification on the decrypted trade message using the user's public key certificate, to generate an encryption key if the verification is successful, to generate a digital envelope according to the encryption key, the private key of the mobile bank server 20, the public key of the comprehensive pre-position bank server 30 and the trade information, and to send the digital envelope to the comprehensive pre-position bank server 30.

The comprehensive pre-position bank server 30 is further configured to decrypt the digital envelope to obtain decrypted trade information using the private key of the comprehensive pre-position bank server 30 and the public key of the mobile bank server 20, to perform a signature verification on the decrypted trade information using the public key of the mobile bank server 20 and to complete the trade if the signature verification is successful.

In the embodiment of the present disclosure, the mobile terminal 10 is further configured to encrypt a trade password or a hash value of the trade password to obtain a cryptograph of the trade password using the public key of the comprehensive pre-position bank server 30, to sign the trade information and the cryptograph of the trade password to generate a first digital signature using the user's private key, to generate an encryption parameter key according to the first random number and the hardware information of the mobile terminal 10, to encrypt the trade information and the cryptograph of the trade password to generate a first message cryptograph using the encryption parameter key, to encrypt the first random number to generate a first key cryptograph using the public key of the mobile bank server 20, and to send the first digital signature, the first message cryptograph and the first key cryptograph to the mobile bank server 20 as the trade message.

The mobile bank server 20 is further configured to decrypt the first key cryptograph to obtain the first random number using the private key of the mobile bank server 20, to generate the encryption parameter key according to the first random number and the hardware information of the mobile terminal 10 stored therein, to decrypt the first message cryptograph to obtain the trade information and the cryptograph of the trade password using the encryption parameter key, and to perform a signature verification on the first digital signature using the user's public key certificate stored therein.

The mobile bank server 20 is further configured to generate the encryption key, to encrypt the user's trade information and the cryptograph of the trade password to generate a second message cryptograph using the encryption key, to encrypt the encryption key to generate a second key cryptograph using the private key of the comprehensive pre-position bank server 30, to sign the trade information and the cryptograph of the trade password to generate a second digital signature using the private key of the mobile bank server 20, and to send the second digital signature, the second message cryptograph and the second key cryptograph to the comprehensive pre-position bank server 30 as the digital envelope.

The comprehensive pre-position bank server 30 is further configured to decrypt the second key cryptograph to obtain the encryption key using the private key of the comprehensive pre-position bank server 30, to decrypt the second message cryptograph to obtain the trade information and the cryptograph of the trade password using encryption key, to perform a signature verification on the second digital signature using the public key of the mobile bank server 20, and to complete the trade according to the trade information if the signature verification is successful.

In order to ensure the safety of the trade password and ensure that an electronic channel cannot be fallen to the ground (i.e. during an information transmission, only a sender and a receiver may know plaintexts of information, and other terminals may only know an encrypted text) in the whole course, the trade password is transmitted from the mobile terminal 10 and the mobile bank server 20 to the comprehensive pre-position bank server 30 in a form of cryptograph. After obtaining the cryptograph of the trade password, the comprehensive pre-position bank server 30 may decrypt the cryptograph of the trade password to obtain the trade password using the private key of the comprehensive pre-position bank server 30, and sends the trade password to a back-end banking system.

Furthermore, the encryption key is a symmetric encryption key.

In the key protection system, after the trade is performed, a private key protection parameter is updated and a user's private key document is encrypted and stored, and an embodiment thereof is as flows.

The mobile terminal 10 is further configured to encrypt and store a user's private key document generated by the user's private key in a predetermined region, to perform a user identify verification during the trade, to generate a second random number if the user identity verification is successful, to obtain a first private key protection parameter and a second private key protection parameter from the mobile bank server 20 according to the second random number, to decrypt the user's private key document stored therein to obtain a first decrypted user's private key document using the second private key protection parameter, to perform a first verification on the first decrypted user's private key document. The mobile terminal 10 is further configured to perform the trade according to the user's private key document and to update an update identification of a private key protection parameter if the first verification is successful, to decrypt the user's private key document stored therein to obtain a second decrypted user's private key document using the first private key protection parameter and to perform a second verification on the second decrypted user's private key document if the first verification is not successful. The mobile terminal 10 is further configured to perform the trade according to the user's private key document and to update the update identification of the private key protection parameter if the second verification is successful, to generate the updated parameter for protecting the private key according to the trade result received thereby, and to send the updated parameter for protecting the private key and the update identification of the private key protection parameter to the mobile bank server 20, and to encrypt and store the user's private key again according to a successful updating result from the mobile bank server 20 and using the updated parameter for protecting the private key.

If the mobile bank server 20 fails to update the private key protection parameter, according to a failed verification result of the mobile bank server 20, the mobile terminal 10 does not encrypt and store the user's private key document by using the updated parameter for protecting the private key generated by the mobile terminal, but encrypts and stores the user's private key document in an original manner which may be a manner of encrypting and storing the user's private key document using the protection key of the user's private key.

In addition, if both the first verification and the second verification are failed, the mobile terminal 10 performs the registration process again.

In the embodiment of the present disclosure, the mobile terminal 10 is further configured to encrypt and store the user's private key document according to a protection key of a user's private key, in which the user's private key document includes the user's private key and hardware information of the mobile terminal 10, and the protection key of the user's private key is generated by all or partial information of the hardware information or a hash value of hardware characteristic information, all or partial information of a login password or a hash value of the login password and the private key protection parameter.

Furthermore, the update identification of the private key protection parameter is updated according to the first private key protection parameter or the second private key protection parameter configured to decrypt the user's private key document.

The mobile bank server 20 is configured to update the second private key protection parameter using the updated parameter for protecting the private key and to update the first private key protection parameter using the second private key protection parameter, if the update identification of the private key protection parameter is an identification corresponding to the second private key protection parameter; the mobile bank server 20 is configured to update the second private key protection parameter using the updated parameter for protecting the private key, if the update identification of the private key protection parameter is an identification corresponding to the first private key protection parameter; the mobile bank server 20 is configured to return a successful updating result to the mobile terminal 10.

The mobile terminal 10 is configured to encrypt the updated parameter for protecting the private key and the update identification of the private key protection parameter to obtain an encrypted updated parameter for protecting the private key and an encrypted update identification of a private key protection parameter using the public key of the mobile bank server 20, and to send the encrypted updated parameter for protecting the private key and the encrypted update identification of the private key protection parameter to the mobile bank server 20; the mobile bank server 20 is further configured to decrypt information from the mobile terminal 10 to obtain the updated parameter for protecting the private key and the update identification of the private key protection parameter using the private key of the mobile bank server 20.

The mobile terminal 10 is further configured to verify the decrypted user's private key document using the hardware information.

The mobile terminal 10 is further configured to encrypt the second random number to obtain an encrypted second random number using the public key of the mobile bank server 20, and to send the encrypted second random number to the mobile bank server 20; the mobile bank server 20 is further configured to decrypt encrypted information from the mobile terminal 10 to obtain the second random number using the private key of the mobile bank server 20, to encrypt the first private key protection parameter and the second private key protection parameter to obtain an encrypted first private key protection parameter and an encrypted second private key protection parameter using the second random number, and to send the encrypted first private key protection parameter and the encrypted second private key protection parameter to the mobile terminal 10; and the mobile terminal 10 is further configured to decrypt information from the mobile bank server 20 to obtain the first private key protection parameter and the second private key protection parameter using the second random number.

The user identify verification between the mobile bank server 20 and the mobile terminal 10 is implemented by means of a verification of a message verification code, a verification of a dynamic password, a verification of an electronic signature token or a verification of a trade password.

It should be noted that, an operation process of each device in the embodiments of the key protection system is same with that of each device in the embodiments of the key protection method, and is omitted herein.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A key protection method, comprising:
   a: storing, by a mobile terminal, a mobile bank server root certificate and a pre-position bank server root certificate,
   downloading and installing, by the mobile terminal, a bank client software on the mobile terminal, the bank client software including, a mobile bank server public key, and a pre-position bank server public key,
   receiving, by the mobile terminal, a registration instruction,
   verifying, by the mobile terminal, the mobile bank server public key and the pre-position bank server public key are correct using the corresponding root certificates,
   establishing, by the mobile terminal, a connection to the mobile bank server,
   generating, by the mobile terminal, a user public key and a user private key according to the registration instruction,
   receiving, by the mobile terminal, first verification information from the mobile bank server,
   displaying, by the mobile terminal, the first verification information and receiving user input corresponding to the first verification information,
   generating, by the mobile terminal, a first random encryption parameter, encrypting, by the mobile terminal, account information, the first verification information, and the first random encryption parameter using the mobile bank server public key, decrypting, by the mobile bank server, the encrypted account information, first verification information, and first random encryption parameter using a mobile bank server private key, verifying, by the mobile bank server, the first verification information, sending, by the mobile bank server, the account information to a pre-position bank server, receiving, by the mobile bank server, an encrypted user public key from the mobile terminal, decrypting, by the mobile bank server, the encrypted user public key, sending, by the mobile bank server, the decrypted user public key, receiving, by the mobile bank server, a certificate of the user public key;

b: performing a verification by the mobile bank server on encrypted trade information of the user using the certificate of the user public key, and performing a trade corresponding to the encrypted trade information by the pre-position bank server;

c: generating by the mobile terminal an updated parameter, sending by the mobile terminal the updated parameter receiving by the mobile terminal a successful updating result from the mobile bank server, encrypting by the mobile terminal the user private key using the updated parameter, and storing, by the mobile terminal, the encrypted user private key.

2. The method according to claim 1, further comprising:
generating by the mobile bank server a second random encryption parameter and a second verification information if the identity of the mobile terminal is verified by the pre-position bank server;

sending by the mobile bank server the second random encryption parameter and the second verification information to the mobile terminal;

encrypting, by the mobile terminal, the second verification information and the user public key using the first random encryption parameter and the second random encryption parameter so as to generate third verification information, and sending by the mobile terminal the third verification information to the mobile bank server; and performing a verification by the mobile bank server on the third verification information from the mobile terminal, and sending by the mobile bank server the user public key to the third-party e-business verification server to be verified and signed so as to generate the certificate of the user public key.

3. The method according to claim 2, further comprising:
encrypting, by the mobile terminal, hardware information of the mobile terminal using the mobile bank server public, in which the hardware information is hardware characteristic information or a hash value of the hardware characteristic information and the hardware characteristic information comprises a device serial number and/or a MAC address of a network card.

4. The method according to claim 3, wherein the account information comprises a phone number, a credit card number and a login password or a hash value of a login password, and wherein the first verification information is a graphic verification code.

5. The method according to claim 1, wherein step b comprises:
b1: receiving by the mobile terminal the user's trade information to generate a first random number, in which the user's trade information comprises at least a trade account and a trade amount;

b2: encrypting by the mobile terminal the user's trade information to generate a trade message using the first random number, hardware information of the mobile terminal, the user private key, public keys of the mobile bank server and the pre-position bank server, and sending by the mobile terminal the trade message to the mobile bank server, in which the hardware information is hardware characteristic information or a hash value of the hardware characteristic information;

b3: decrypting by the mobile bank server the trade message to obtain a decrypted trade message using a private key of the mobile bank server and the hardware information of the mobile terminal stored therein, and performing a verification by the mobile bank server on the decrypted trade message using the certificate of the user public key;

b4: generating by the mobile bank server an encryption key if the verification is successful, generating by the mobile bank server a digital envelope according to the encryption key, the private key of the mobile bank server, the public key of the pre-position bank server and the trade information, and sending by the mobile bank server the digital envelope to the pre-position bank server; and b5: decrypting by the pre-position bank server the digital envelope to obtain decrypted trade information using the private key of the pre-position bank server and the mobile bank server public key, and performing a signature verification by the pre-position bank server on the decrypted trade information using the mobile bank server public key and completing by the pre-position bank server the trade if the signature verification is successful.

6. The method according to claim 5, wherein step b2 comprises:
encrypting by the mobile terminal a trade password or a hash value of the trade password to obtain a cryptograph of the trade password using the public key of the preposition bank server, and signing by the mobile terminal the trade information and the cryptograph of the trade password to generate a first digital signature using the user private key;

generating by the mobile terminal an encryption parameter key according to the first random number and the hardware information of the mobile terminal, and encrypting by the mobile terminal the trade information and the cryptograph of the trade password to generate a first message cryptograph using the encryption parameter key;

encrypting by the mobile terminal the first random number to generate a first key cryptograph using the mobile bank server public key; and sending by the mobile terminal the first digital signature, the first message cryptograph and the first key cryptograph to the mobile bank server as the trade message.

7. The method according to claim 6, wherein step b3 comprises:
decrypting by the mobile bank server the first key cryptograph to obtain the first random number using the private key of the mobile bank server;

generating by the mobile bank server the encryption parameter key according to the first random number and the hardware information of the mobile terminal stored therein, decrypting by the mobile bank server the first message cryptograph to obtain the trade information and the cryptograph of the trade password using the encryption parameter key; and performing a signature verification by the mobile bank server on the first digital signature using the certificate of the user public key stored therein.

8. The method according to claim 7, wherein step b4 comprises:

generating by the mobile bank server the encryption key;

encrypting by the mobile bank server the user's trade information and the cryptograph of the trade password to generate a second message cryptograph using the encryption key;

encrypting by the mobile bank server the encryption key to generate a second key cryptograph using the public key of the pre-position bank server;

signing by the mobile bank server the trade information and the cryptograph of the trade password to generate a second digital signature using the private key of the mobile bank server; and sending by the mobile bank server the second digital signature, the second message cryptograph and the second key cryptograph to the pre-position bank server as the digital envelope.

9. The method according to claim 1, wherein step c comprises:

c1: generating by the mobile terminal a user private key document generated by the user private key, and encrypting and storing by the mobile terminal the user private key document in a predetermined region;

c2: performing a user identity verification by the mobile terminal during the trade, and generating by the mobile terminal a second random number if the user identity verification is successful, and obtaining by the mobile terminal a first private key protection parameter and a second private key protection parameter from the mobile bank server according to the second random number;

c3: decrypting by the mobile terminal the user private key document stored therein to obtain a first decrypted user private key document using the second private key protection parameter, and performing a first verification by the mobile terminal on the first decrypted user private key document;

c4: performing the trade using the user private key document and updating an update identification of a private key protection parameter if the first verification is successful;

c5: decrypting the user private key document stored therein to obtain a second decrypted user private key document using the first private key protection parameter and performing a second verification on the second decrypted user private key document if the first verification is not successful;

c6: performing the trade using the user private key document and updating the update identification of the private key protection parameter if the second verification is successful;

c7: generating by the mobile terminal the updated parameter for protecting the private key according to the trade result received thereby, and sending by the mobile terminal the updated parameter for protecting the private key and the update identification of the private key protection parameter to the mobile bank server; and c8: encrypting and storing by the mobile terminal the user private key document again according to a successful updating result from the mobile bank server and using the updated parameter for protecting the private key.

10. The method according to claim 9, wherein updating an update identification of a private key protection parameter in step c4 or c6 comprises:

updating the update identification of the private key protection parameter according to the first private key protection parameter or the second private key protection parameter, wherein the first private key protection parameter and the second private key protection parameter are configured to decrypt the user private key document.

11. The method according to claim 9, between step c7 and step c8, further comprising:

updating by the mobile bank server the second private key protection parameter using the updated parameter for protecting the private key and updating the first private key protection parameter using the second private key protection parameter, if the update identification of the private key protection parameter is an identification corresponding to the second private key protection parameter;

updating by the mobile bank server the second private key protection parameter using the updated parameter for protecting the private key, if the update identification of the private key protection parameter is an identification corresponding to the first private key protection parameter;

returning by the mobile bank server a successful updating result to the mobile terminal.

12. The method according to claim 11, wherein sending by the mobile terminal the updated parameter for protecting the private key and the update identification of the private key protection parameter to the mobile bank server in step c7 comprises:

encrypting by the mobile terminal the updated parameter for protecting the private key and the update identification of the private key protection parameter using the mobile bank server public key, and sending by the mobile terminal an encrypted updated parameter for protecting the private key and an encrypted update identification of the private key protection parameter to the mobile bank server;

wherein, between step c7 and step c8, the method further comprises: decrypting by the mobile bank server information from the mobile terminal to obtain the updated parameter for protecting the private key and the update identification of the private key protection parameter using the private key of the mobile bank server.

13. The method according to claim 9, wherein obtaining by the mobile terminal a first private key protection parameter and a second private key protection parameter from the mobile bank server according to the second random number in step c2 comprises:

encrypting by the mobile terminal the second random number using the mobile bank server public key, and sending by the mobile terminal the encrypted second random number to the mobile bank server;

decrypting by the mobile bank server encrypted information from the mobile terminal to obtain the second random number using the private key of the mobile bank server;

encrypting by the mobile bank server the first private key protection parameter and the second private key protection parameter to obtain an encrypted first private key protection parameter and an encrypted second private key protection parameter using the second random number, and sending by the mobile bank server the encrypted first private key protection parameter and the encrypted second private key protection parameter to the mobile terminal; and decrypting by the mobile terminal information from the mobile bank server to obtain the first private key protection parameter and the second private key protection parameter using the second random number.

14. A key protection system, comprising a mobile terminal, a mobile bank server and a pre-position bank server, wherein the mobile terminal is configured to:
store a mobile bank server root certificate and a pre-position bank server root certificate,
download and install a bank client software on the mobile terminal, the bank client software including a mobile bank server public key and a pre-position bank server public key,
receive a registration instruction,
verify the mobile bank server public key and the pre-position bank server public key are correct using the corresponding root certificates,
establish a connection to the mobile bank server,
generate a user public key and a user private key according to the registration instruction and send the user public key to the mobile bank server;
receive first verification information from the mobile bank server,
display the first verification information and receiving user input corresponding to the first verification information,
generate a first random encryption parameter,
encrypt account information, the first verification information, and the first random encryption parameter, thereby obtaining encrypted information using the mobile bank server public key; and
wherein the mobile bank server is configured to:
decrypt the encrypted account, and first random encryption parameter using a mobile bank server private key,
verify the first verification information,
send the account information to the pre-position bank server,
receive an encrypted user public key from the mobile terminal,
decrypt the encrypted user public key,
send the decrypted user public key,
receive a certificate of the user public key;
perform a verification on encrypted trade information of the user using the certificate of the user public key, and performing a trade corresponding to the encrypted trade information by the pre-position bank server; and
wherein the mobile terminal is further configured to generate an updated parameter, to send the updated parameter, to receive a successful updating result from the mobile bank server and to encrypt and store the user private key using the updated parameter.

15. The system according to claim 14,
wherein, if the verification result is correct, the mobile bank server is further configured to generate a second random encryption parameter and second verification information if the identity of the mobile terminal is verified by the pre-position bank server, and to send the second random encryption parameter and the second verification information to the mobile terminal;
the mobile terminal is further configured to encrypt the second verification information and the user public key using the first random encryption parameter and the second random encryption parameter so as to generate third verification information, and to send the third verification information to the mobile bank server;
the mobile bank server is further configured to perform a verification on the third verification information from the mobile terminal, and to send the user public key to the third-party e-business verification server to be verified and signed so as to generate the certificate of the user public key.

16. The system according to claim 15, wherein
the mobile terminal is further configured to encrypt hardware information of the mobile terminal using the mobile bank server public key, in which the hardware information is hardware characteristic information or a hash value of the hardware characteristic information and the hardware characteristic information comprises a device serial number and/or a MAC address of a network card.

17. The system according to claim 16, wherein the account information comprises a phone number, a credit card number and a login password or a hash value of a login password, and wherein the first verification information is a graphic verification code.

18. The system according to claim 14, wherein
the mobile terminal is further configured to receive the user's trade information to generate a first random number, in which the user's trade information of user comprises at least a trade account and a trade amount, to encrypt the user's trade information to generate a trade message using the first random number, hardware information of the mobile terminal, the user private key, public keys of the mobile bank server and the pre-position bank server, and to send the trade message to the mobile bank server, in which the hardware information is hardware characteristic information or a hash value of the hardware characteristic information;
the mobile bank server is further configured to decrypt the trade message using a private key of the mobile bank server and the hardware information of the mobile terminal stored therein to obtain a decrypted trade message, to perform a verification on the decrypted trade message using the certificate of the user public key, to generate an encryption key if the verification is successful, to generate a digital envelope according to the encryption key, the private key of the mobile bank server, the public key of the pre-position bank server and the trade information, and to send the digital envelope to the pre-position bank server;
the pre-position bank server is further configured to decrypt the digital envelope to obtain decrypted trade information using the private key of the preposition bank server and the mobile bank server public key, to perform a signature verification on the decrypted trade information using the mobile bank server public key and to complete the trade if the signature verification is successful.

19. The system according to claim 14
wherein the mobile terminal is further configured to:
encrypt and store a user private key document generated by the user private key in a predetermined region;

perform a user identify verification during the trade, generate a second random number if the user identity verification is successful, and obtain a first private key protection parameter and a second private key protection parameter from the mobile bank server according to the second random number;

decrypt the user private key document stored therein to obtain a first decrypted user private key document using the second private key protection parameter, perform a first verification on the first decrypted user private key document;

perform the trade using the user private key document and update an update identification of a private key protection parameter if the first verification is successful;

decrypt the user private key document stored therein to obtain a second decrypted user private key document using the first private key protection parameter and perform a second verification on the second decrypted user private key document if the first verification is not successful;

perform the trade using the user private key document and update the update identification of the private key protection parameter if the second verification is successful;

generate the updated parameter for protecting the private key according to the trade result received thereby, and send the updated parameter for protecting the private key and the update identification of the private key protection parameter to the mobile bank server; and encrypt and store the user private key again according to a successful updating result from the mobile bank server and using the updated parameter for protecting the private key.

20. The system according to claim 19, wherein
the mobile bank server is configured to update the second private key protection parameter using the updated parameter for protecting the private key and to update the first private key protection parameter using the second private key protection parameter, if the update identification of the private key protection parameter is an identification corresponding to the second private key protection parameter;

the mobile bank server is configured to update the second private key protection parameter using the updated parameter for protecting the private key, if the update identification of the private key protection parameter is an identification corresponding to the first private key protection parameter;

the mobile bank server is configured to return a successful updating result to the mobile terminal.

* * * * *